(12) United States Patent  (10) Patent No.: US 9,197,730 B2
Baek et al.  (45) Date of Patent: Nov. 24, 2015

(54) MOBILE TERMINAL AND CONTROLLING METHOD THEREOF

(71) Applicants: Songyi Baek, Seoul (KR); Kyunghye Seo, Seoul (KR)

(72) Inventors: Songyi Baek, Seoul (KR); Kyunghye Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 256 days.

(21) Appl. No.: 13/660,184

(22) Filed: Oct. 25, 2012

(65) Prior Publication Data

US 2014/0055376 A1    Feb. 27, 2014

(30) Foreign Application Priority Data

Aug. 23, 2012 (KR) .......................... 10-2012-0092427

(51) Int. Cl.
  *H04M 1/725*  (2006.01)
  *G06F 3/0488*  (2013.01)
(52) U.S. Cl.
  CPC ......... *H04M 1/72519* (2013.01); *G06F 3/0488* (2013.01); *G06F 2203/04803* (2013.01); *H04M 1/72544* (2013.01); *H04M 2250/10* (2013.01); *H04M 2250/22* (2013.01)
(58) Field of Classification Search
  CPC ................................................ H04M 1/72519
  See application file for complete search history.

(56) References Cited

U.S. PATENT DOCUMENTS

| | | | |
|---|---|---|---|
| 2010/0081475 A1* | 4/2010 | Chiang et al. | 455/564 |
| 2011/0081953 A1* | 4/2011 | Higuchi | 455/566 |
| 2011/0209058 A1* | 8/2011 | Hinckley et al. | 715/702 |
| 2012/0038570 A1* | 2/2012 | Delaporte | 345/173 |
| 2012/0084721 A1* | 4/2012 | Gimpl et al. | 715/800 |
| 2012/0235894 A1* | 9/2012 | Phillips | 345/156 |
| 2012/0236035 A1* | 9/2012 | Kimura | 345/660 |
| 2012/0289290 A1* | 11/2012 | Chae et al. | 455/566 |

* cited by examiner

*Primary Examiner* — Jason Olson
(74) *Attorney, Agent, or Firm* — KED & Associates LLP

(57) ABSTRACT

A mobile terminal and controlling method thereof are disclosed, which facilitates display screen space of mobile terminal to be flexibly utilized in consideration of user's convenience and necessity. The present invention includes displaying $1^{st}$ screen on $1^{st}$ region within touchscreen, if $1^{st}$ gesture is detected, forming $2^{nd}$ region within the touchscreen, displaying at least one portion of the $1^{st}$ screen of the $1^{st}$ region at a timing point of detecting the $1^{st}$ gesture as $2^{nd}$ screen, when touch input to the $1^{st}$ region is detected or the $2^{nd}$ region is formed, changing the $1^{st}$ screen of the $1^{st}$ region into $3^{rd}$ screen automatically, if $2^{nd}$ gesture is detected, generating merged screen including at least one portion of the $3^{rd}$ screen of the $1^{st}$ region and at least one portion of the $2^{nd}$ screen of the $2^{nd}$ region, and displaying the merged screen on $3^{rd}$ region.

20 Claims, 31 Drawing Sheets

(1)

(2)

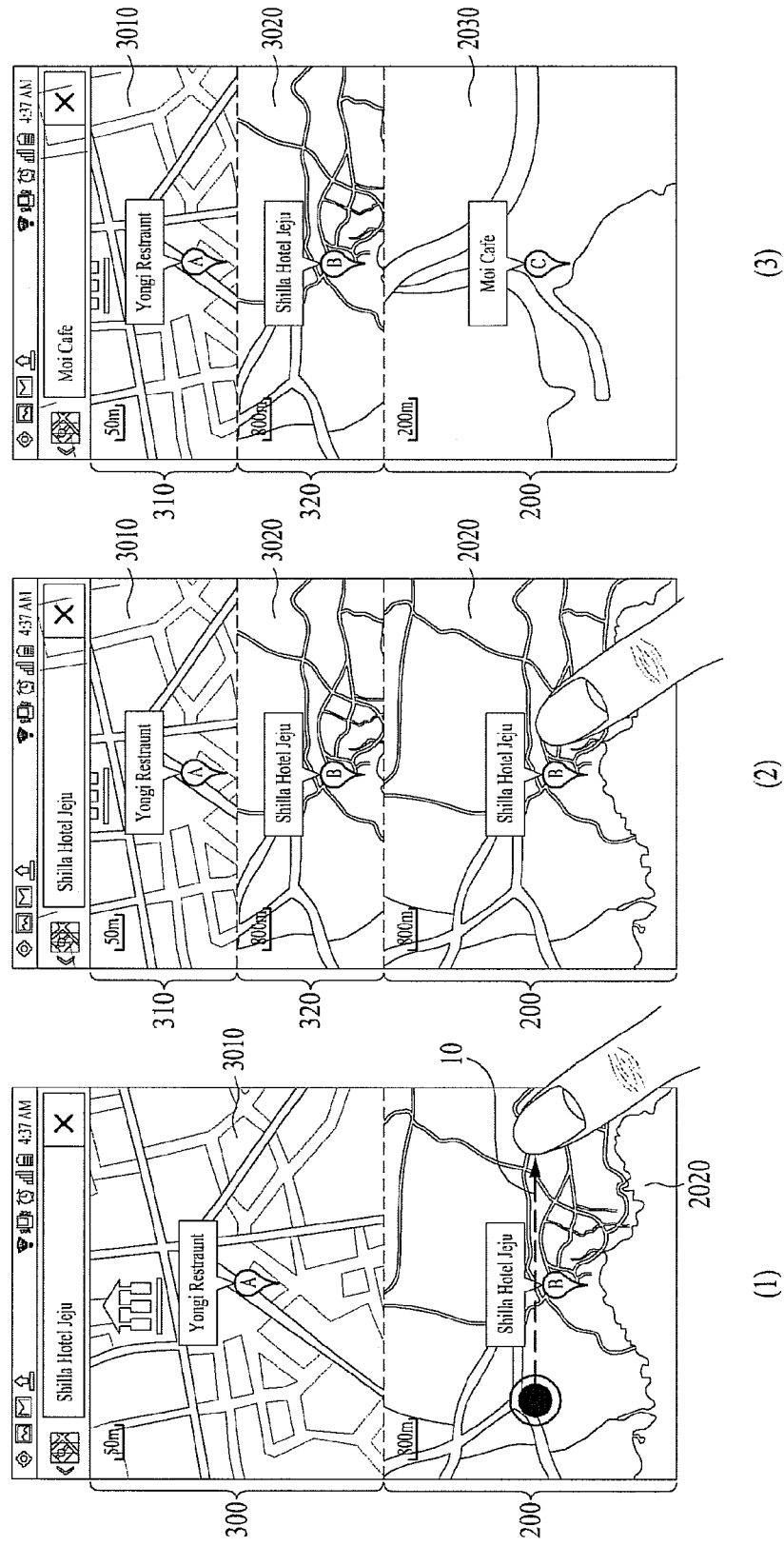

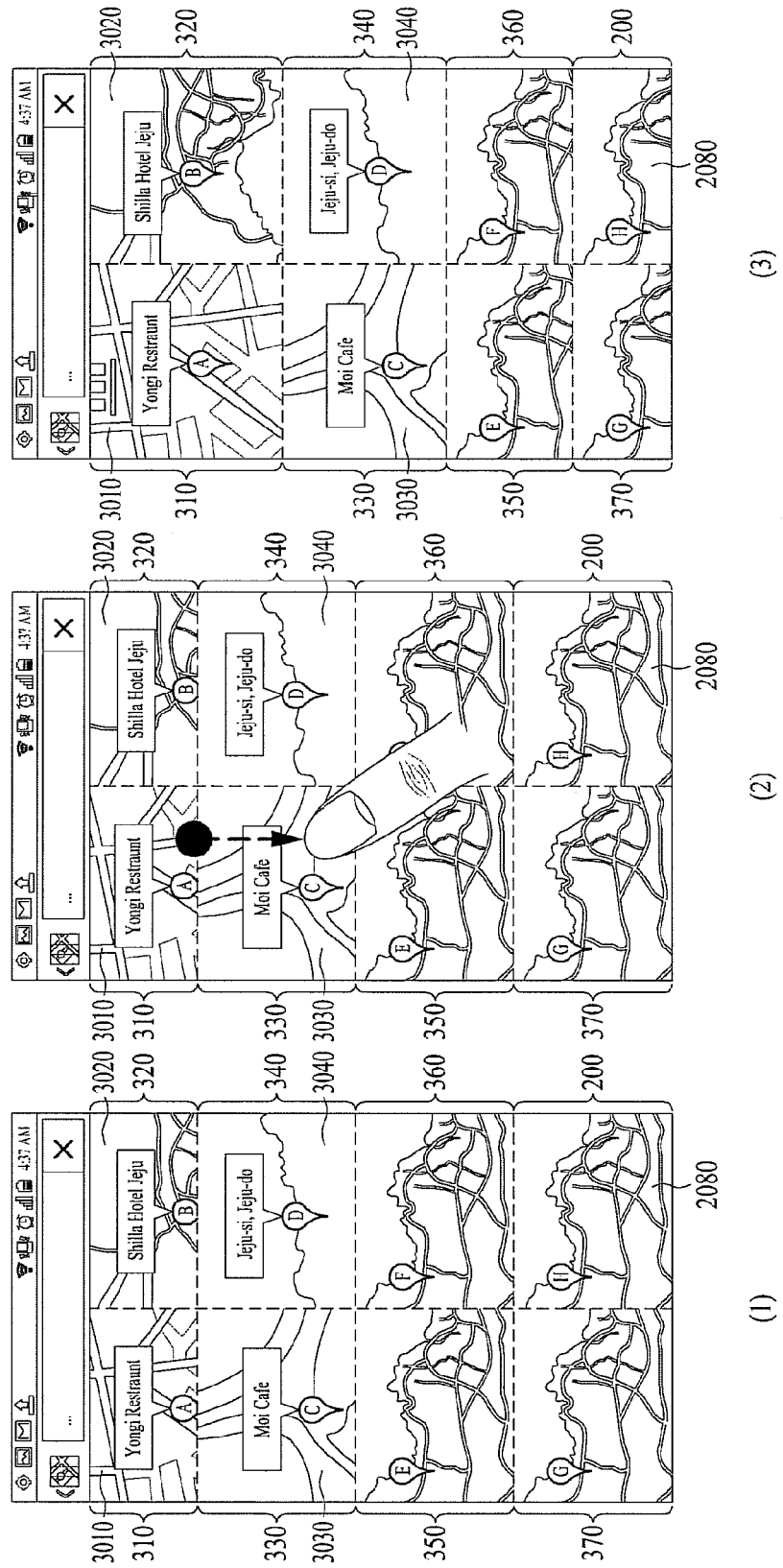

FIG. 22
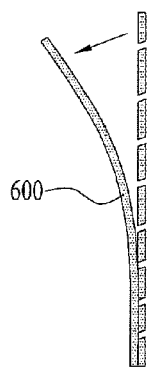
(a)
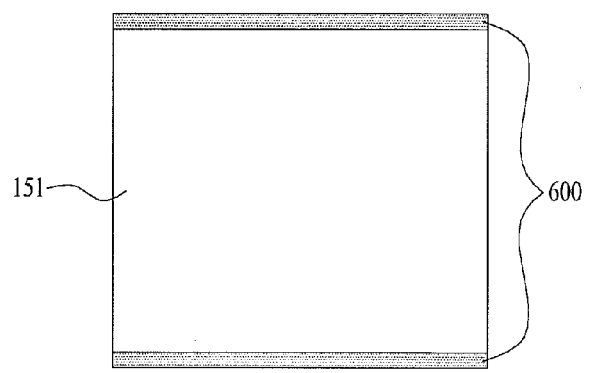
(b)
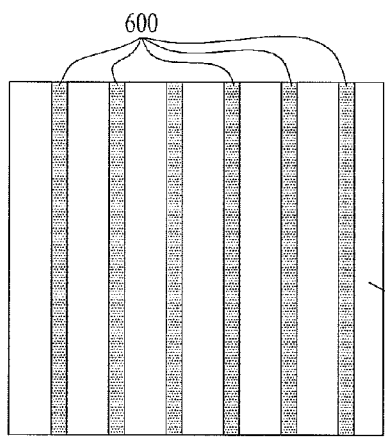
(c)
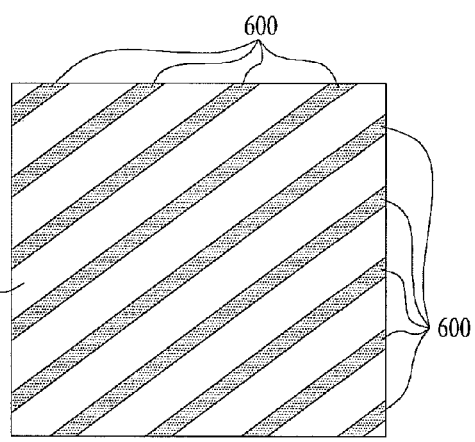
(d)

MOBILE TERMINAL AND CONTROLLING METHOD THEREOF

Pursuant to 35 U.S.C. §119(a), this application claims the benefit of earlier filing date and right of priority to Korean Application No. 10-2012-0092427, filed on Aug. 23, 2012, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for facilitating a display screen space of a mobile terminal to be flexibly utilized in consideration of user's convenience and necessity.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to their degree (e.g., ease) of mobility. Further, the mobile terminals can be further classified into handheld terminals and vehicle mount terminals according to the manner of portability.

There are ongoing efforts to support and increase the functionality of mobile terminals. Such efforts include software and hardware improvements, as well as changes and improvements in the structural components which form the mobile terminal.

In the above-configured mobile terminal, a wide or spacious display screen provides a user with convenience within an appropriate range. As a result, manufacturers of mobile terminals tend to further extend a display screen space by increasing a size of an LCD panel configured to display an active operation screen in a mobile terminal.

However, in most of mobile terminal, since a single screen is outputted at a time irrespective of a size of a display screen space, a content currently displayed on a screen is changed by such a touch input to a display screen as a zoom-in/zoom-out, a scroll and the like. Moreover, if a different job is performed on the mobile terminal, a previously displayed screen is not displayed any more. As a result, in order to view the previously displayed screen, it is inconvenient for a user to search for a previously displayed content by manually changing or manipulating the display screen.

When contents are searched by several steps or editing jobs or the like are performed several times, since results of the corresponding steps are not displayed on a single screen, it is difficult to compare or compile the results of the corresponding steps with each other efficiently. Moreover, since a result of a previous step is not saved, it is inconvenient for a user to perform a same job repetitively if needing the corresponding result.

SUMMARY OF THE INVENTION

Accordingly, the present invention is directed to a mobile terminal and controlling method thereof that substantially obviate one or more problems due to limitations and disadvantages of the related art.

One object of the present invention is to provide a mobile terminal and controlling method thereof, by which a pre-changed screen and a post-changed screen are simultaneously displayed on a display unit despite that a user changes a display screen by a series of jobs.

Another object of the present invention is to provide a mobile terminal and controlling method thereof, by which results at a prescribed timing point can be conveniently compiled or paged in the course of changing a display screen.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to the present invention may include a touchscreen configured to display a $1^{st}$ screen on a $1^{st}$ region and a controller, if a $1^{st}$ gesture is detected, forming a $2^{nd}$ region on which at least one portion of the $1^{st}$ screen of the $1^{st}$ region at a timing point of detecting the $1^{st}$ gesture to be displayed as a $2^{nd}$ screen, the controller, when a touch input to the $1^{st}$ region is detected or the $2^{nd}$ region is formed, changing the $1^{st}$ screen of the $1^{st}$ region into a $3^{rd}$ screen automatically, the controller, if a $2^{nd}$ gesture is detected, generating a merged screen including at least one portion of the $3^{rd}$ screen of the $1^{st}$ region and at least one portion of the $2^{nd}$ screen of the $2^{nd}$ region, the controller controlling the merged screen to be displayed on a $3^{rd}$ region.

In another aspect of the present invention, a mobile terminal according to the present invention may include a touchscreen configured to display a $1^{st}$ screen on a $1^{st}$ region and a controller, if a $1^{st}$ gesture is detected, forming a $2^{nd}$ region on which at least one portion of the $1^{st}$ screen of the $1^{st}$ region at a timing point of detecting the $1^{st}$ gesture to be displayed as a $2^{nd}$ screen, the controller, when a touch input to the $1^{st}$ region is detected or the $2^{nd}$ region is formed, changing the $1^{st}$ screen of the $1^{st}$ region into a $3^{rd}$ screen automatically, the controller, if a $2^{nd}$ gesture is detected, controlling the 3rd screen of the 1st region into the 2nd screen of the 2nd region.

In another aspect of the present invention, a method of controlling a mobile terminal according to the present invention may include the steps of displaying a $1^{st}$ screen on a $1^{st}$ region within a touchscreen, if a $1^{st}$ gesture is detected, forming a $2^{nd}$ region within the touchscreen, displaying at least one portion of the $1^{st}$ screen of the $1^{st}$ region at a timing point of detecting the $1^{st}$ gesture as a $2^{nd}$ screen, when a touch input to the $1^{st}$ region is detected or the $2^{nd}$ region is formed, changing the $1^{st}$ screen of the $1^{st}$ region into a $3^{rd}$ screen automatically, if a $2^{nd}$ gesture is detected, generating a merged screen including at least one portion of the $3^{rd}$ screen of the $1^{st}$ region and at least one portion of the $2^{nd}$ screen of the $2^{nd}$ region, and displaying the merged screen on a $3^{rd}$ region.

In a further aspect of the present invention, a recording medium according to the present invention may include a program recorded therein, the program including $1^{st}$ to $6^{th}$ commands, wherein the $1^{st}$ command is provided to display a $1^{st}$ screen on a $1^{st}$ region within a touchscreen, wherein if a 1st gesture is detected, the $2^{nd}$ command is provided to form a $2^{nd}$ region within the touchscreen, wherein the $3^{rd}$ command is provided to display at least one portion of the $1^{st}$ screen of the $1^{st}$ region at a timing point of detecting the $1^{st}$ gesture as a $2^{nd}$ screen, wherein when a touch input to the $1^{st}$ region is detected or the $2^{nd}$ region is formed, the $4^{th}$ command is provided to change the $1^{st}$ screen of the $1^{st}$ region into a $3^{rd}$ screen automatically, wherein if a $2^{nd}$ gesture is detected, the $5^{th}$ command is provided to generate a merged screen including at least one portion of the $3^{rd}$ screen of the $1^{st}$ region and at least one portion of the $2^{nd}$ screen of the $2^{nd}$ region, and wherein the $6^{th}$ command is provided to display the merged screen on a $3^{rd}$ region.

Effects obtainable from the present invention may be non-limited by the above mentioned effect. And, other unmentioned effects can be clearly understood from the following description by those having ordinary skill in the technical field to which the present invention pertains. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 8 is a diagram for one example of displaying a plurality of $2^{nd}$ regions in case of repeating a $1^{st}$ gesture;

FIG. 9 is a diagram for one example of changing sizes of portions of a plurality of $2^{nd}$ regions;

FIG. 22 is a diagram of a flexible display according to one embodiment of the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

Features of embodiments of the present invention are applicable to various types of terminals. Examples of such terminals include mobile terminals, such as mobile phones, user equipment, smart phones, mobile computers, digital broadcast terminals, personal digital assistants, portable multimedia players (PMP) and navigators. However, by way of non-limiting example only, further description will be with regard to a mobile terminal 100, and it should be noted that such teachings may apply equally to other types of terminals such as digital TV, desktop computers and so on.

Figure 1:
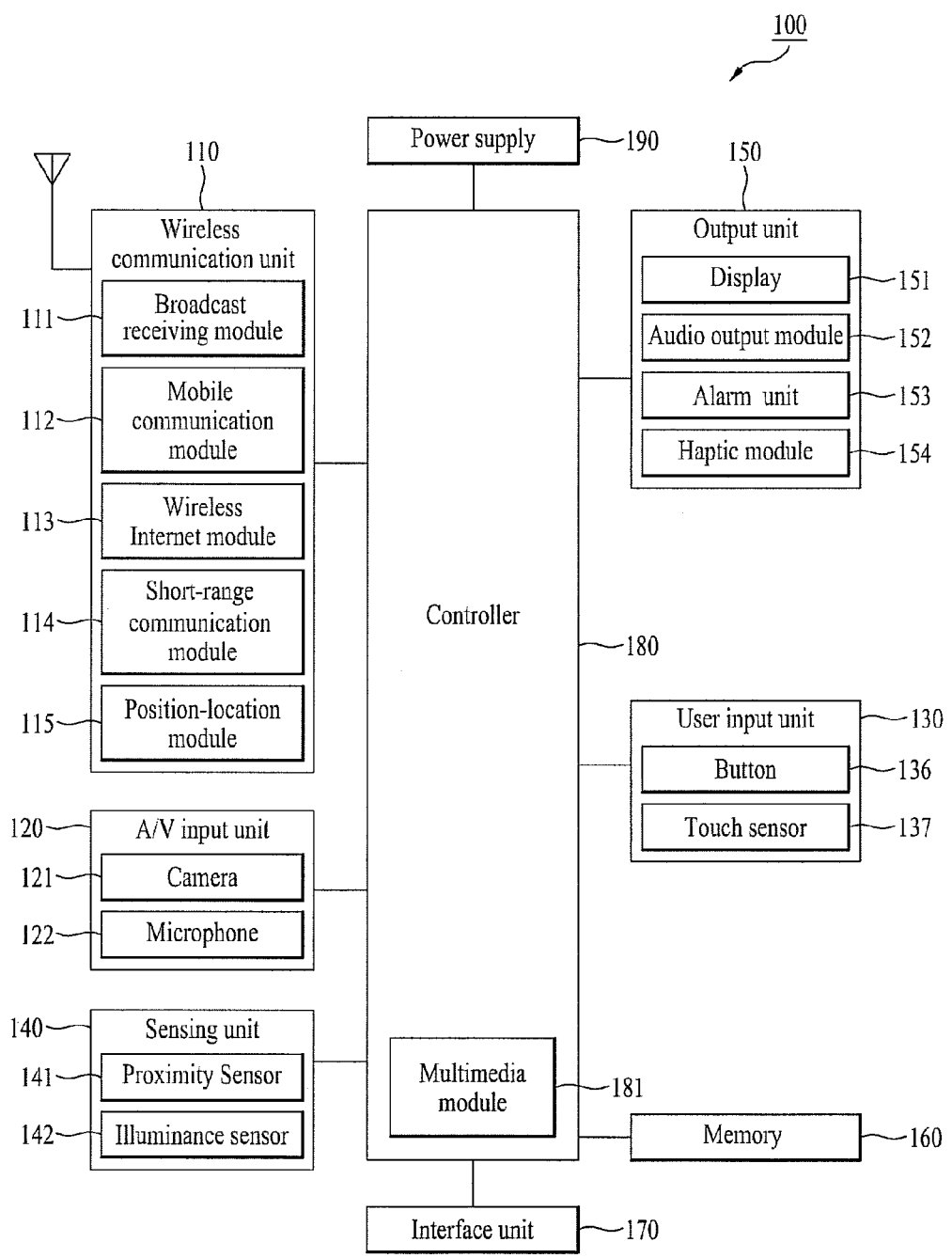
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. More or fewer components may be implemented according to various embodiments.

The wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided in the mobile terminal 100 to facilitate simultaneous reception of at least two broadcast channels or broadcast channel switching.

The broadcast managing server is generally a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and/or a data broadcast signal, among other signals. If desired, the broadcast signal may further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and an electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as the memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include NFC (Near Field Communication), radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a button 136 provided to front/rear/lateral side of the mobile terminal 100 and a touch sensor (constant pressure/electrostatic) 137 and may further include a key pad, a dome switch, a jog wheel, a jog switch and the like [not shown in the drawing].

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. By nonlimiting example, such sensing unit 140 include, gyro sensor, accelerate sensor, geomagnetic sensor.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, and a haptic module 154 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor 141 can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

For clarity and convenience of explanation, an action for enabling the pointer approaching the touchscreen to be recognized as placed on the touchscreen may be named 'proximity touch' and an action of enabling the pointer to actually come into contact with the touchscreen may be named 'contact touch'. And, a position, at which the proximity touch is made to the touchscreen using the pointer, may mean a position of the pointer vertically corresponding to the touchscreen when the pointer makes the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module

154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include a Near Field Communication (NFC) Chip, User Identify Module (UIM), Subscriber Identity Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

It is not mandatory for the identity module to be detachably attached to the mobile terminal 100 via the interface unit 170. Alternatively, the identity module may be installed as a sort of the memory unit 160 in a manner of being permanently built in the mobile terminal 100.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
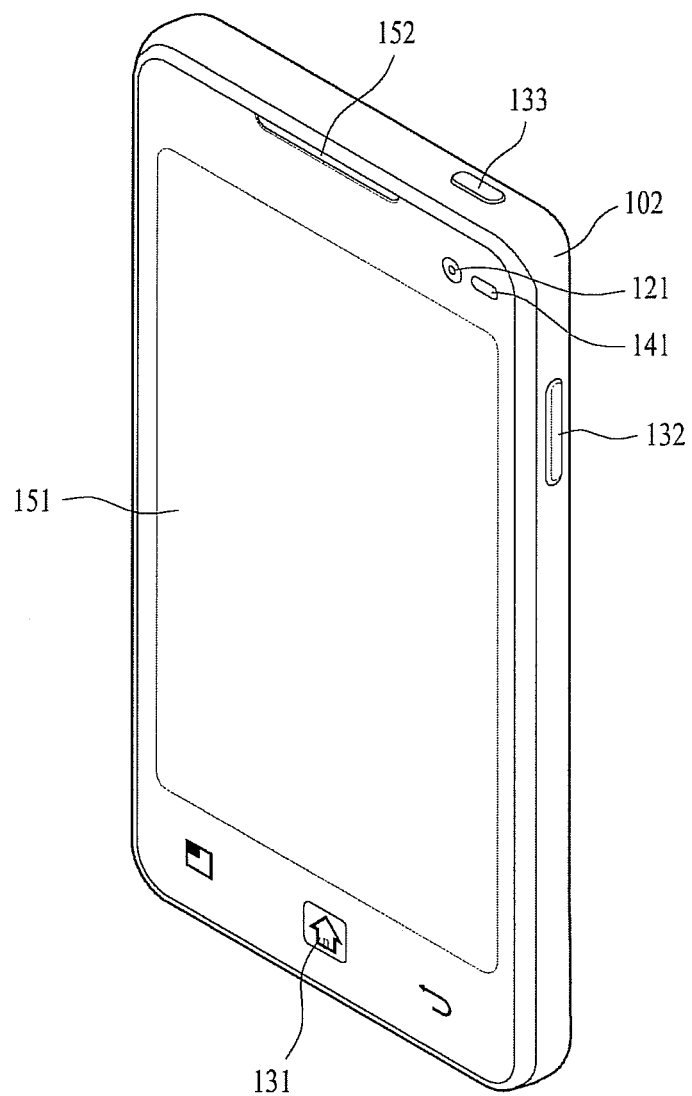
FIG. 2 is a front perspective diagram of a mobile terminal according to one embodiment of the present invention.

FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

Occasionally, electronic components can be mounted on a surface of the rear case 102. The electronic part mounted on the surface of the rear case 102 may include such a detachable part as a battery, a USIM card, a memory card and the like. In doing so, the rear case 102 may further include a backside cover 103 configured to cover the surface of the rear case 102. In particular, the backside cover 103 has a detachable configuration for user's convenience. If the backside cover 103 is detached from the rear case 102, the surface of the rear case 102 is exposed.

Referring to FIG. 2, if the backside cover 103 is attached to the rear case 102, a lateral side of the rear case 102 may be exposed in part. If a size of the backside cover 103 is decreased, a rear side of the rear case 102 may be exposed in part. If the backside cover 103 covers the whole rear side of the rear case 102, it may include an opening 103' configured to expose a camera 121' or an audio output unit 152' externally.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Figure 3:
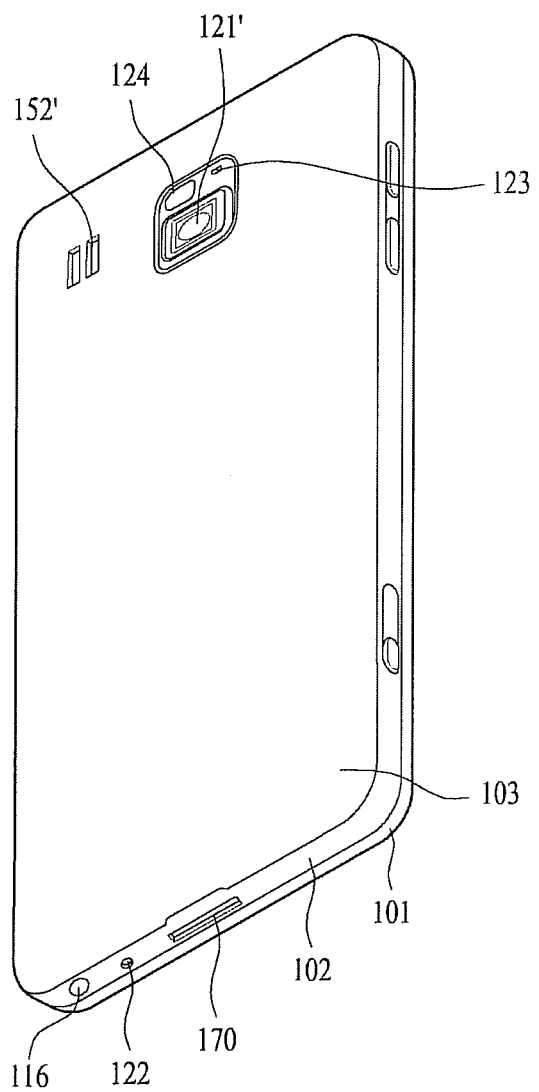
FIG. 3 is a rear perspective diagram of a mobile terminal according to one embodiment of the present invention.

FIG. 3 is a perspective diagram of a backside of the terminal shown in FIG. 2.

Figure 21A:
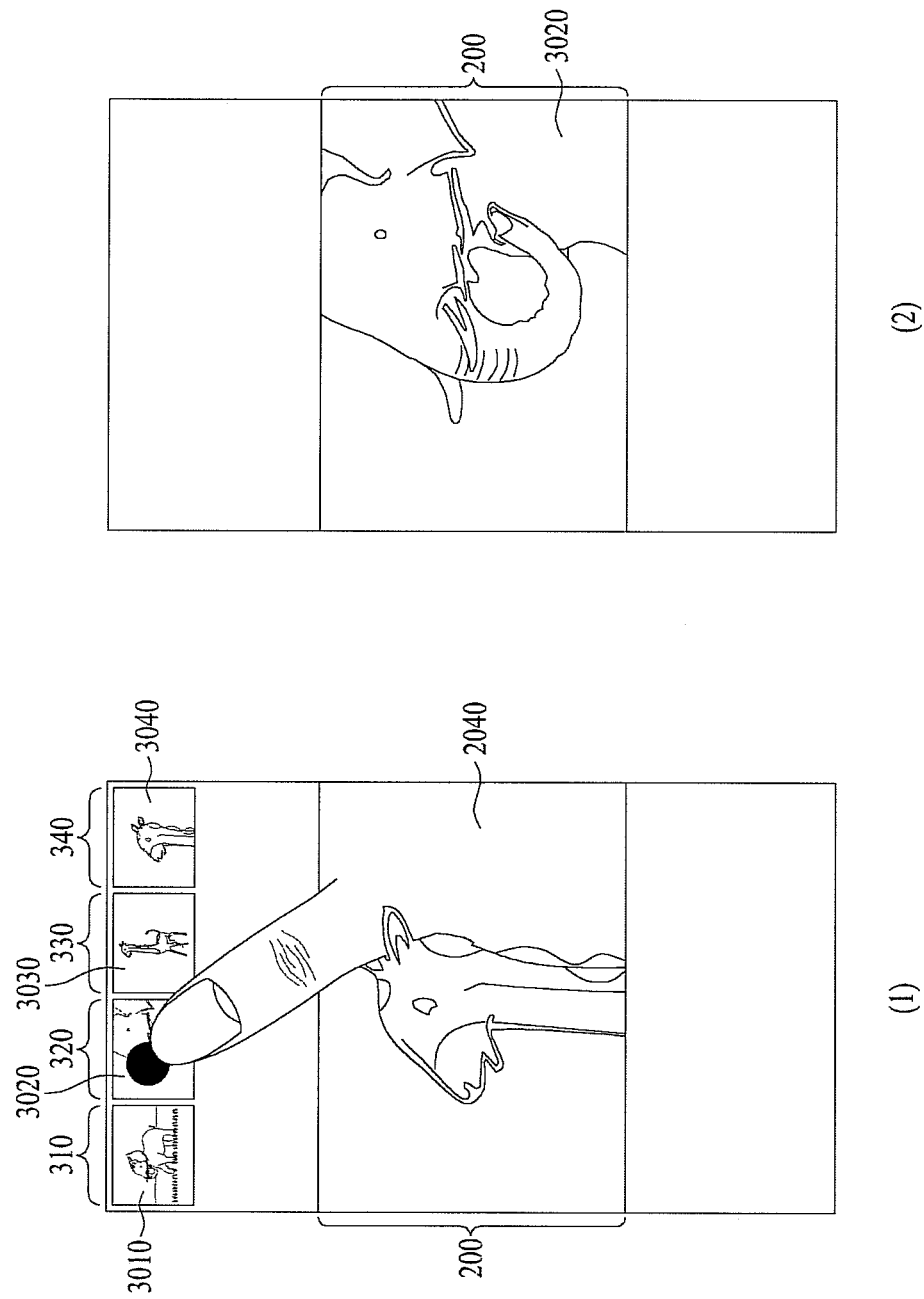
FIG. 21A and FIG. 21B are diagrams for a control flow in case of utilizing a control of a mobile terminal according to another embodiment of the present invention on an active image viewer screen.
Figure 21B:
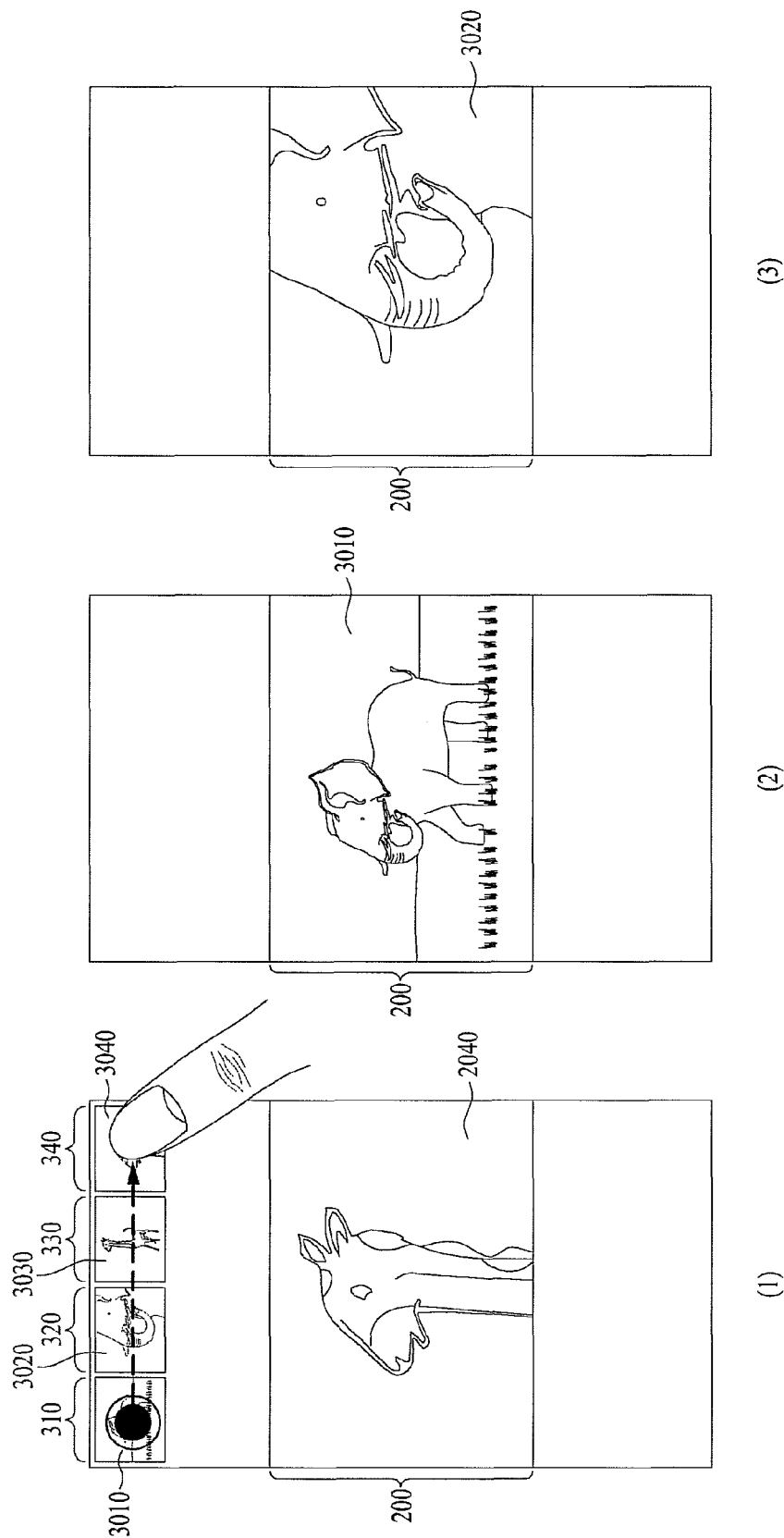

Referring to FIG. 3, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2 and may be used for implementation of a speakerphone mode in talking over the terminal.

A broadcast signal receiving antenna 116 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display 151. In this case, if the display 151 is configured to output visual information from both of its faces, the visual information is viewable via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display 151 of the front case 101. The touchpad 135 can be provided in rear of the display 151 in parallel. The touchpad 135 can have a size equal to or smaller than that of the display 151.

In the following description, a control method implemented in the above-configured mobile terminal according to one embodiment of the present invention is explained with reference to FIGS. 4 to 5E.

For clarity of the following description, assume that a mobile terminal mentioned in the following description includes at least one of the components shown in FIG. 1. In particular, a mobile terminal according to the present invention includes the display unit 151 and the controller 180 among the components shown in FIG. 1 at least. If the display unit 151 includes a touchscreen, implementation of the following embodiments may be further facilitated. Therefore, the following description is made on the assumption that the display unit 151 includes a touchscreen 151.

Figure 4:
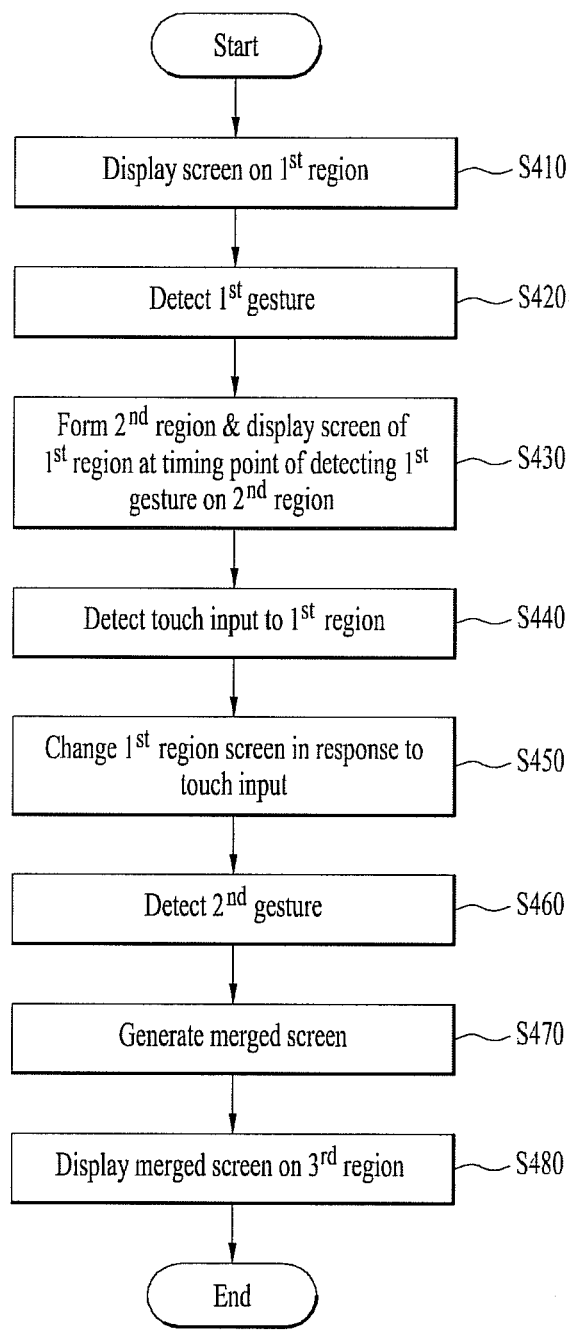
FIG. 4 is a flowchart for a method of controlling a mobile terminal according to one embodiment of the present invention.

FIG. 4 is a flowchart for a method of controlling a mobile terminal according to one embodiment of the present invention.

Referring to FIG. 4, a $1^{st}$ screen 2010 is displayed on a $1^{st}$ region 200 of the touchscreen 151 of the mobile terminal [S410]. In particular, the $1^{st}$ region 200 may occupy a full screen of the touchscreen 151 [cf. FIG. 5A]. Alternatively, the $1^{st}$ region 200 may occupy a partial screen of the touchscreen 151 [cf. FIG. 15A]. The $1^{st}$ screen 2010 may include such a screen, which is displayed in the course of an ongoing operation of the mobile terminal, as a user interface screen of an operating system (OS), an active screen of one of various applications implemented through software codes, a multimedia content play screen and the like, by which a type of the $1^{st}$ screen 151 may be non-limited.

While the $1^{st}$ screen 2010 is displayed on the $1^{st}$ region 200 of the touchscreen 151, a $1^{st}$ gesture 10 is detected [S420]. In particular, the $1^{st}$ gesture 10 may include a touch input of a specific pattern performed on the touchscreen 151 representatively [cf. FIG. 5A] or an action causing a physical change to the touchscreen 151 including a flexible display [cf. FIG. 7A], by which the $1^{st}$ gesture 10 may be non-limited. Regarding a case that the touchscreen 151 includes the flexible display, corresponding details shall be described in detail later.

If the $1^{st}$ gesture 101 is detected form the touchscreen 151, the controller 180 forms a $2^{nd}$ region 300 and then controls at least one portion of the $1^{st}$ screen 2010, which is displayed on the $1^{st}$ region at the timing point of detecting the $1^{st}$ gesture 10, to be displayed as a $2^{nd}$ screen 3010 on the $2^{nd}$ region 300 [S430].

In particular, the $2^{nd}$ region 300 is discriminated from the $1^{st}$ region 200 formed within the touchscreen 151 and the controller 180 may be able to form a plurality of the $2^{nd}$ regions 300. According to one embodiment, the $2^{nd}$ region 300 may be formed outside the $1^{st}$ region 200. In particular, the $2^{nd}$ region 300 may be formed contiguous with the $1^{st}$ region 200 to share a boundary with the $1^{st}$ region 200 [cf. FIG. 5B] or may be formed in a manner of being spaced apart from the $1^{st}$ region 200 [cf. FIG. 15A]. In this case, when the $2^{nd}$ region 300 is formed, a size of the $1^{st}$ region 200 may be reduced by a size of the $2^{nd}$ region 300. According to another embodiment, the $2^{nd}$ region 300 may be formed within the $1^{st}$ region 200 [not shown in the drawing]. In this case, a boundary shared between the $1^{st}$ region 200 and the $2^{nd}$ region 300 may be formed.

According to one embodiment, a position of forming the $2^{nd}$ region 300 and a size of the $2^{nd}$ region 300 may set in advance. In this case, if the $1^{st}$ gesture 10 is detected, the controller 180 may be able to form the $2^{nd}$ region 300 in a preset size at a preset position on the touchscreen 151. Since the $1^{st}$ gesture 10 is repeatedly performed, if a plurality of the $2^{nd}$ regions 300 are formed, positions and sizes of the $2^{nd}$ region 300 may be variably set in accordance with the number of the formed $2^{nd}$ regions 300.

For instance, in case that two $2^{nd}$ regions 300 are formed, the two $2^{nd}$ regions 300 are arranged as shown in FIG. (2). For another instance, in case that 7 $2^{nd}$ regions 300 are formed, the 7 $2^{nd}$ regions 300 may be arranged as shown in FIG. 9 (1). For another instance, a plurality of the $2^{nd}$ regions in small size may be arranged on a top end of the touchscreen 151. A size of the preset $2^{nd}$ region 300 may be changeable in response to a user's manipulation, which shall be described in detail later.

In forming the $2^{nd}$ region 300, the controller 180 controls at least one portion of the $1^{st}$ screen 201, which is displayed on the $1^{st}$ region at the timing point of inputting the $1^{st}$ gesture 10, to be displayed as the $2^{nd}$ screen 3010 on the $2^{nd}$ region 300. Through this, if the $2^{nd}$ region 300 is formed, a partial or full screen of the $1^{st}$ screen 2010, which is displayed on the $1^{st}$ region when the $1^{st}$ gesture 10 is inputted by a user, is copied to the $2^{nd}$ region 300.

In doing so, the $2^{nd}$ screen 3010 displayed on the $2^{nd}$ region 300 may include an image screen generated from capturing the $1^{st}$ screen 2010 of the $1^{st}$ region only or a screen containing a separate input unit that can be manipulated by a user's touch input irrespective of the $1^{st}$ region 200. In the latter case, when the $2^{nd}$ region 300 is formed, a job performed on the $1^{st}$ region 200 may be copied to the $2^{nd}$ region 300. Thereafter, a job different from the former job performed on the $1^{st}$ region 200 may be performed on the $2^{nd}$ region 300 by a user's input.

After the $2^{nd}$ region 30 has been formed, if a user's touch input is detected from the $1^{st}$ region 200 [S440] or the $2^{nd}$ region 300 is formed, the $1^{st}$ screen 2010 of the $1^{st}$ region is changed into a $3^{rd}$ screen 2020 automatically in response to the touch input [S450].

If a touch input is performed on the $1^{st}$ region 200, a screen of the $1^{st}$ region 200 may be changed in response to the touch input. In particular, the touch input may include a command input for performing a job, which is different from a previously performed job, within an application active in the $1^{st}$ region 200. Alternatively, the touch input may include such a command input, which is provided to change a display state of the $1^{st}$ screen 2010 on the $1^{st}$ region 200, as a screen zoom-in, a screen zoom-out, a screen scroll and the like. In the former case, the $3^{rd}$ screen 2020 after the change may include an active screen of the different job in response to the touch input. In the latter case, the $3^{rd}$ screen 2020 may include a screen changed by the zoom-in, zoom-out or scroll of the $1^{st}$ screen 2010.

Alternatively, even if a touch input is not performed on the $1^{st}$ region 200, the controller 180 changes a screen of the $1^{st}$ region 200 automatically as soon as forms the $2^{nd}$ region 300 in response to the $1^{st}$ gesture 10. For instance, as the $2^{nd}$ region 300 is formed, the controller 180 may perform a search on the $1^{st}$ region 200 automatically using a different keyword [cf. FIG. 14A (2)]. Alternatively, the controller 180 activates a different relevant application [cf. FIG. 17 (s)] and then displays a screen of the activated application as the $3^{rd}$ screen 2020.

Meanwhile, the $2^{nd}$ region 300 may be separately manipulated or may not. If the $2^{nd}$ region 300 is not separately manipulated, the controller 180 maintains the screen of the $2^{nd}$ region 300 as the $2^{nd}$ screen 3010 so that the screen displayed on the $1^{st}$ region 200 becomes different from the screen displayed on the $2^{nd}$ region 300.

After the screen 2010 of the $1^{st}$ region 200 has been changed into the $3^{rd}$ screen 2020, a $2^{nd}$ gesture 20 may be detected [S460]. In particular, the $2^{nd}$ gesture 20 may include a touch input of a specific pattern performed on the touchscreen 151 [cf. FIG. 5D] or an action causing a physical change to the touchscreen 151 including a flexible display [cf. FIG. 7B], by which the $2^{nd}$ gesture 20 may be non-limited. In this case, the $1^{st}$ gesture 10 and the $2^{nd}$ gesture 20 may be preferably identical to each other but may be different from each other.

If the $2^{nd}$ gesture 20 is detected from the touchscreen 151, the controller 180 generates a merged screen 4010 [S470]. In particular, the merged screen 4010 may include at least one portion of the $3^{rd}$ screen 2020 displayed on the $1^{st}$ region and at least one portion of the $2^{nd}$ screen 3010 displayed on the $2^{nd}$ region. For instance, the merged screen 4010 may include a new screen generated from merging the results of the search jobs respectively performed on the $1^{st}$ region 200 and the $2^{nd}$ region 300 [cf. FIG. 5E, FIG. 13B, FIG. 14B (3)] or a new image generated from merging the image displayed on the $1^{st}$ region 200 and the image displayed on the $2^{nd}$ region 300 together [cf. FIG. 15B].

In particular, the merged screen 4010 may include a screen on which at least one portion of the $3^{rd}$ screen 2020 displayed on the $1^{st}$ region 200 and at least one portion of the $2^{nd}$ screen 3010 displayed on the $2^{nd}$ region 300 are simply arranged together. Alternatively, the merged screen 4010 may include a screen in which information indicating the correlations between the contents respectively included in the $2^{nd}$ screen 3010 and the $3^{rd}$ screen 2020 is contained. In this case, in order to obtain the information indicating the correlations between the contents, the controller 180 may further execute the step of performing a separate operation using the content included in each of the screens.

Thus, the controller 180 generates the merged screen 4010 and then displays the merged screen 4010 on the $3^{rd}$ region 400 [S480]. In particular, the $3^{rd}$ region 400 may include the region generated from merging the $1^{st}$ region 200 and the $2^{nd}$ region 300 together [cf. FIG. 5E]. The $3^{rd}$ region 400 may be identical to the $1^{st}$ region 200 or the $2^{nd}$ region 300 [cf. FIG. 15B (2)]. And, the $3^{rd}$ region 400 may be different from the $1^{st}$ region 200 or the $2^{nd}$ region 300. The merged screen 4010 generated by the controller 180 may be saved in the memory 160 of the mobile terminal 100 by a user.

According to the present embodiment, while a user is performs a series of jobs, the user makes the $1^{st}$ gesture 10 at a desired timing point and may be then able to separate a job screen at the desired timing point into a separate screen. Since the job screens at the respective timing points are simultaneously displayed on the $1^{st}$ region 200 and the $2^{nd}$ region 300, respectively, the user may be able to conveniently compare the screens at the different timing points to each other in the course of performing a series of the jobs. Moreover, if the $2^{nd}$ region 300 is generated, the screen at desired timing point can be maintained on the touchscreen 151. Therefore, it may be unnecessary for the user to perform a saving job to memorize a job screen at a specific timing point. And, it may be unnecessary for the user to perform a screen switching job to review the job screen at the specific timing point.

Moreover, it may be unnecessary for the user to separately perform a job of generating the merged screen 4010 from merging the screens at different timing points together. Since the user is able to obtain the correlation between the contents at a glance through the merged screen 4010, use efficiency can be enhanced. Besides, the user may have enhanced accessibility to information by referring to the saved merged screen 4010 if necessary.

In the following description, a mobile terminal and controlling method thereof according to embodiments of the present invention are explained in detail with reference to FIGS. 5A to 21B.

FIGS. 5A to 12 show the cases that the mobile terminal control according to the present invention is utilized on an active map application screen 5010. In particular, FIGS. 5A to 5E show a series of processes for utilizing the aforementioned embodiment on an active map application screen 5010 and FIGS. 6 to 12 show various different embodiments. First of all, one utilized example of the aforementioned embodiment is described in detail with reference to FIGS. 5A to 5E as follows.

Figure 5A:
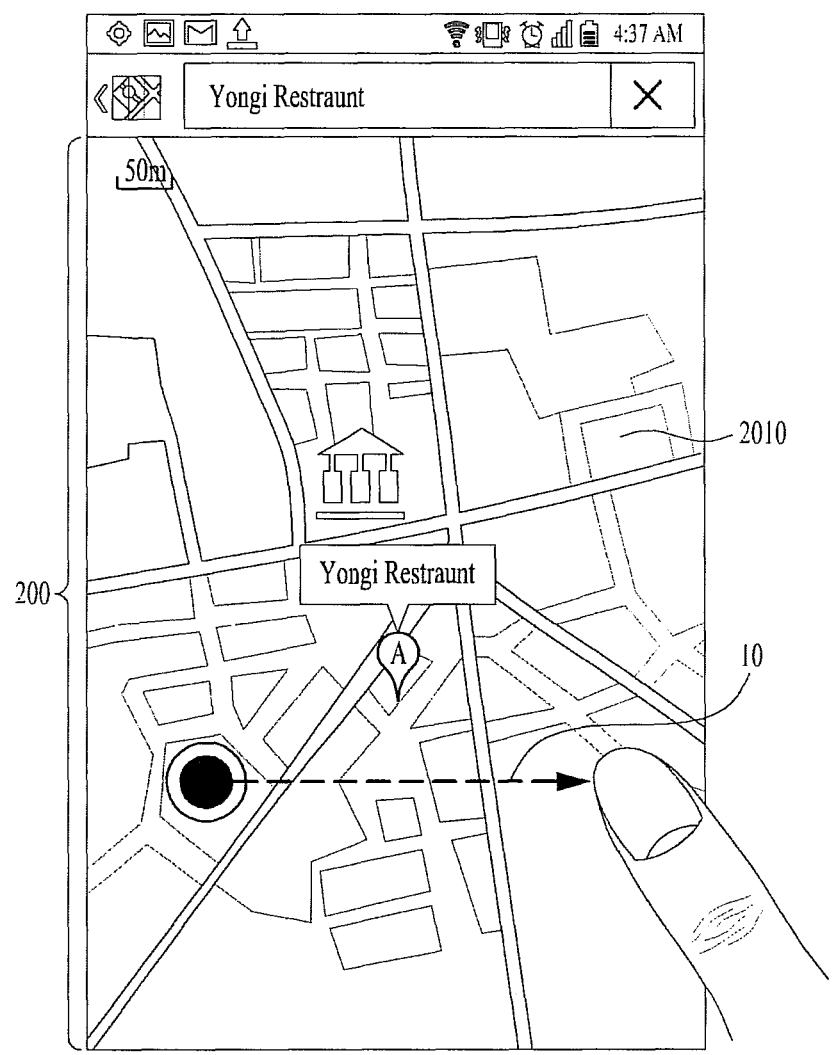
FIGS. 5A to 5E are diagrams for configurations of an active map application screen for a control flow in case of implementing a method of controlling a mobile terminal according to one embodiment of the present invention.

Referring to FIG. 5A, a $1^{st}$ screen 2010 displayed on a $1^{st}$ region 200 occupying a full screen of the touchscreen 151 may include an active map application screen 5010. At the timing point corresponding to FIG. 5A, a user searches for 'Yongi Restaurant' using a map application. In doing so, a scale (e.g., 1 cm to 50 m), which is most appropriate to obtain the place 'Yongi Restaurant' by manipulating a map, is used.

For clarity, as a process for searching a map for a specific area is apparent to those skilled in the art, details with the detailed drawings for the process shall be omitted from the following description.

Figure 5B:
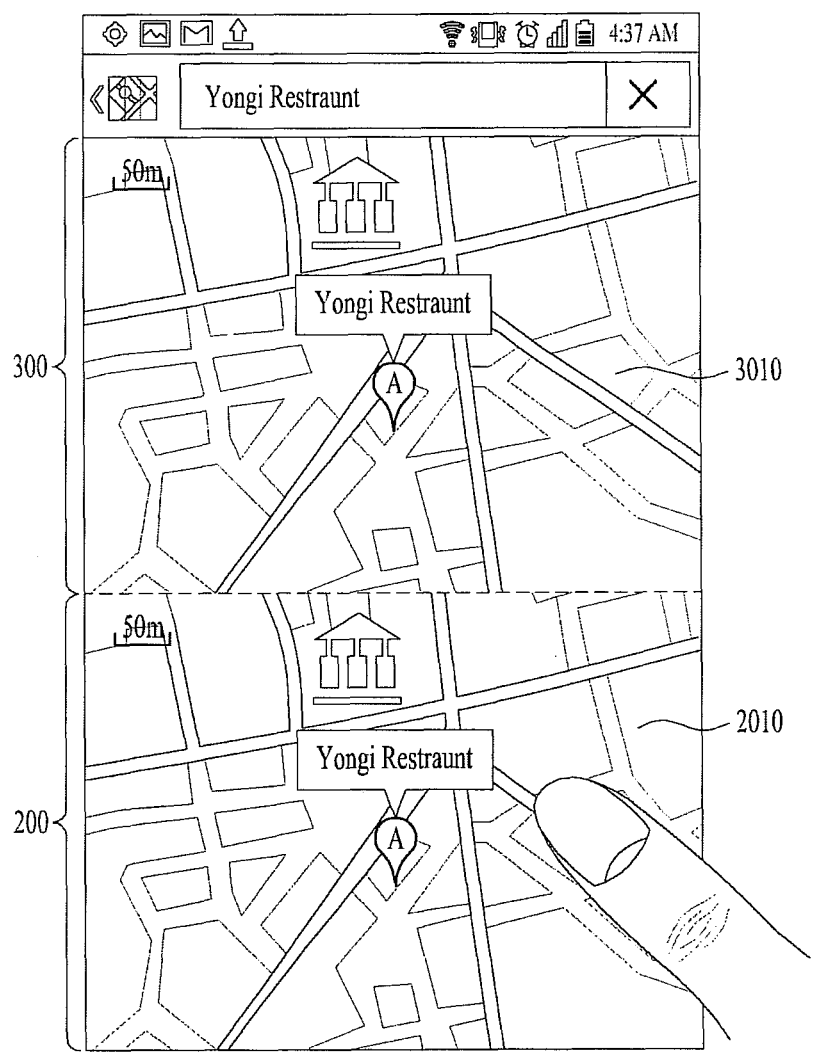

Subsequently, if a $1^{st}$ gesture 10 is performed [FIG. 5A], the controller 180 forms a $2^{nd}$ region 200 and then controls at least one portion of the $1^{st}$ screen 2010 of the $1^{st}$ region 200 to be displayed as a $2^{nd}$ screen 3010 on the $2^{nd}$ region 300 [FIG. 5B]. In doing so, the $1^{st}$ gesture 10 may be designated as a touch input of a specific pattern. For instance, referring to FIG. 5A, the $1^{st}$ gesture 10 may be set to a touch input performed in a manner of performing a long-touch and drag on the touchscreen 151. Once the $2^{nd}$ region 300 is formed, the controller 180 separately controls the $1^{st}$ region 200 and the $2^{nd}$ region 300. If a touch input is performed on the $1^{st}$ region 200, the $1^{st}$ screen 2010 of the $1^{st}$ region 2010 is manipulated separately from the $2^{nd}$ screen 3010 of the $2^{nd}$ region 300.

Figure 5C:
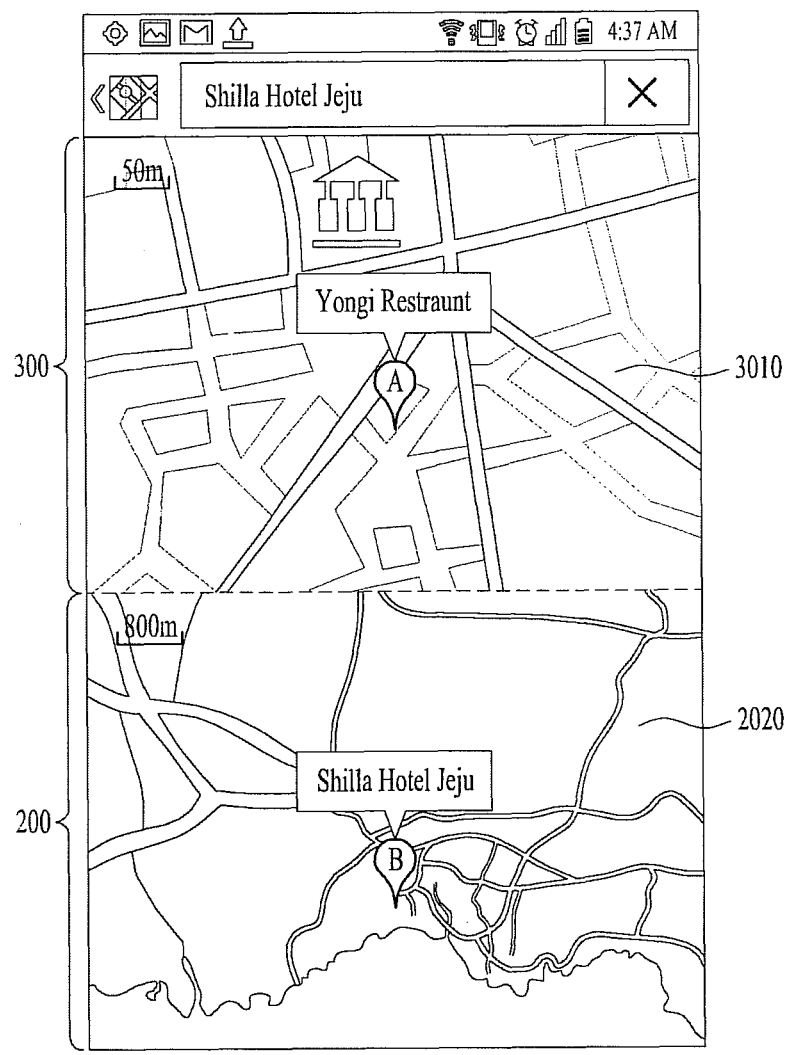

If a touch input is performed on the $1^{st}$ region 200 to search for 'Shilla Hotel Jeju', referring to FIG. 5C, the controller 180 may be able to control a $3^{rd}$ screen 2020, which displays 'Shilla Hotel Jeju', to be displayed on the $1^{st}$ region 200. In doing so, in order to efficiently obtain the place, a user may be able to change a map scale (e.g., 1 cm to 800 m) by reducing a screen of the $1^{st}$ region 200. Since a touch input is not performed on the $2^{nd}$ region 300, as shown in FIG. 5C, the screen 3010, on which the place 'Yongi Restaurant' is displayed, can be still maintained in the $2^{nd}$ region 300.

If a touch input is detected from the $2^{nd}$ region 300, the controller 180 may be able to change the $2^{nd}$ screen 3010 into a $4^{th}$ screen in response to the touch input [not shown in the drawing]. For instance, if a user performs a touch input on the $2^{nd}$ region 300 to enlarge a screen under the circumstance shown in FIG. 5C, the $4^{th}$ screen may be displayed in a manner of the map marked with the 'Yongi Restaurant' is further enlarged. In doing so, the screen of the $1^{st}$ region 200 is not affected by the screen change of the $2^{nd}$ region 300.

Figure 5D:
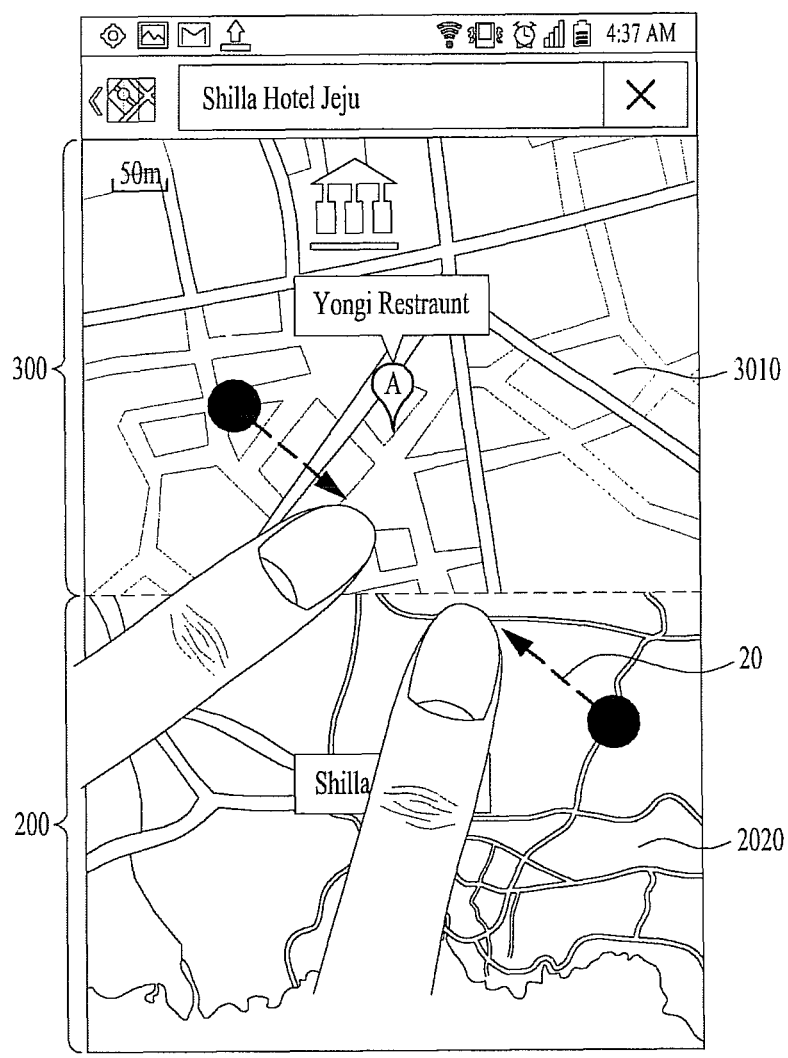
Figure 5E:
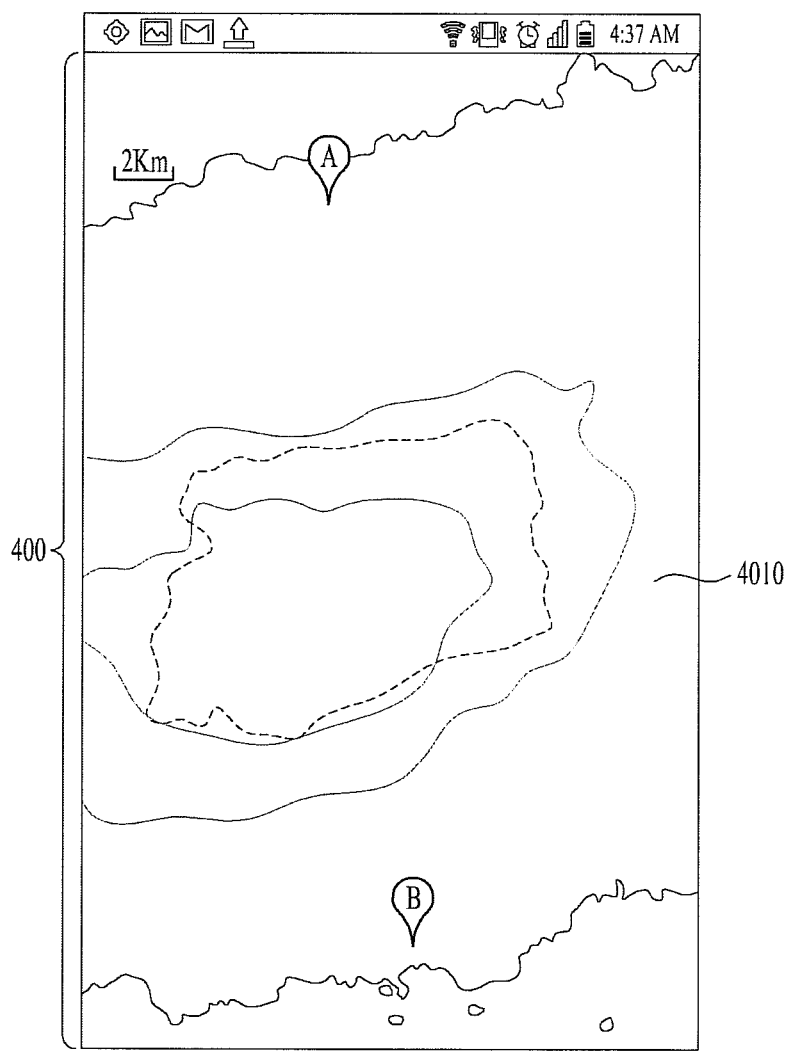

While the $3^{rd}$ screen 2020 and the $2^{nd}$ screen 3010 are displayed on the $1^{st}$ region 200 and the $2^{nd}$ region 300 by manipulating the $1^{st}$ region 200 in response to a user's touch input, respectively, if a $2^{nd}$ gesture 20 is performed [FIG. 5D], the controller 180 generates a merged screen 4010 and then controls the merged screen 4010 to be displayed on the $3^{rd}$ region 400 [FIG. 5E]. In doing so, the $2^{nd}$ gesture 20 may be designated as a touch input of a specific pattern. For instance, the $2^{nd}$ gesture 20 may include a touch input for pinching in the $1^{st}$ region 200 and the $2^{nd}$ region 300.

According to the present embodiment, referring to FIG. 5E, the merged screen 4010 may include a map screen in which a location information B of the 'Shilla Hotel Jeju' corresponding to a portion of the $3^{rd}$ screen 2020 of the $1^{st}$ region and a location information A of the 'Yongi Restaurant' corresponding to a portion of the $2^{nd}$ screen 3010 of the $2^{nd}$ region are included. Preferably, the map of the merged screen 4010 may be displayed on a reduced scale (e.g., 1 cm to 2 km) for displaying both of the location information contents A and B simultaneously to enable a user to recognize the location information of the 'Shilla Hotel Jeju' and the location information of the 'Yongi Restaurant' at a glance.

According to the present embodiment, a user generates and controls the screen of the $2^{nd}$ region 300, which is separated from the previously manipulated screen of the $1^{st}$ region 200, thereby using a map on a reduced scale most efficient to find each place in searching for different places without changing or switching screens. Moreover, the controller 180 generates a map displayed on the merged screen 4010 to show locations of different places at a time, thereby enhancing convenience.

In the following description, various embodiments of the present invention are explained with reference to FIGS. 6 to 12.

Figure 6:
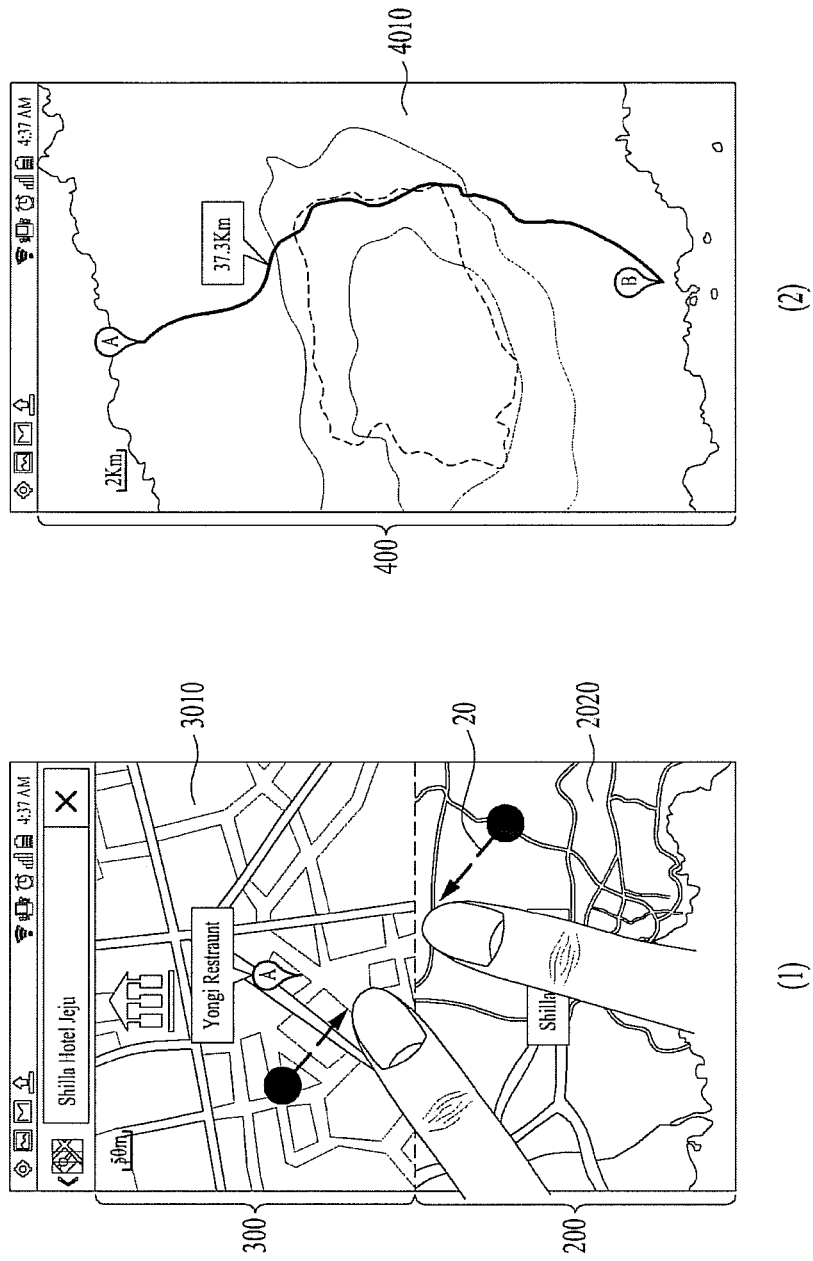
FIG. 6 is a diagram for one example of an merged screen according to another embodiment of the present invention.

FIG. 6 shows a merged screen 4010 configured in a manner of further containing other informations.

Referring to FIG. 6, according to one embodiment of the present invention, a merged screen 4010 may be able to contain information indicating correlation between a content (location information B) included in a $3^{rd}$ screen 2020 of a $1^{st}$ region and a content (location information A) included in a $2^{nd}$ screen 3010 of a $2^{nd}$ region.

In particular, if a $2^{nd}$ touch gesture 20 is performed on the touchscreen 151, the controller 180 generates a merged screen 4010 [FIG. 6 (1)]. In doing so, the merged screen 4010 may be able to further contain a shortest path between the location information content B contained in the $3^{rd}$ screen 2020 of the $1^{st}$ region and the location information content A contained in the $2^{nd}$ screen 3010 of the $2^{nd}$ region and a length information of the path [FIG. 6 (2)]. In this case, a user may be able to acquire additional information on the contents A and B more conveniently.

Figure 7A:
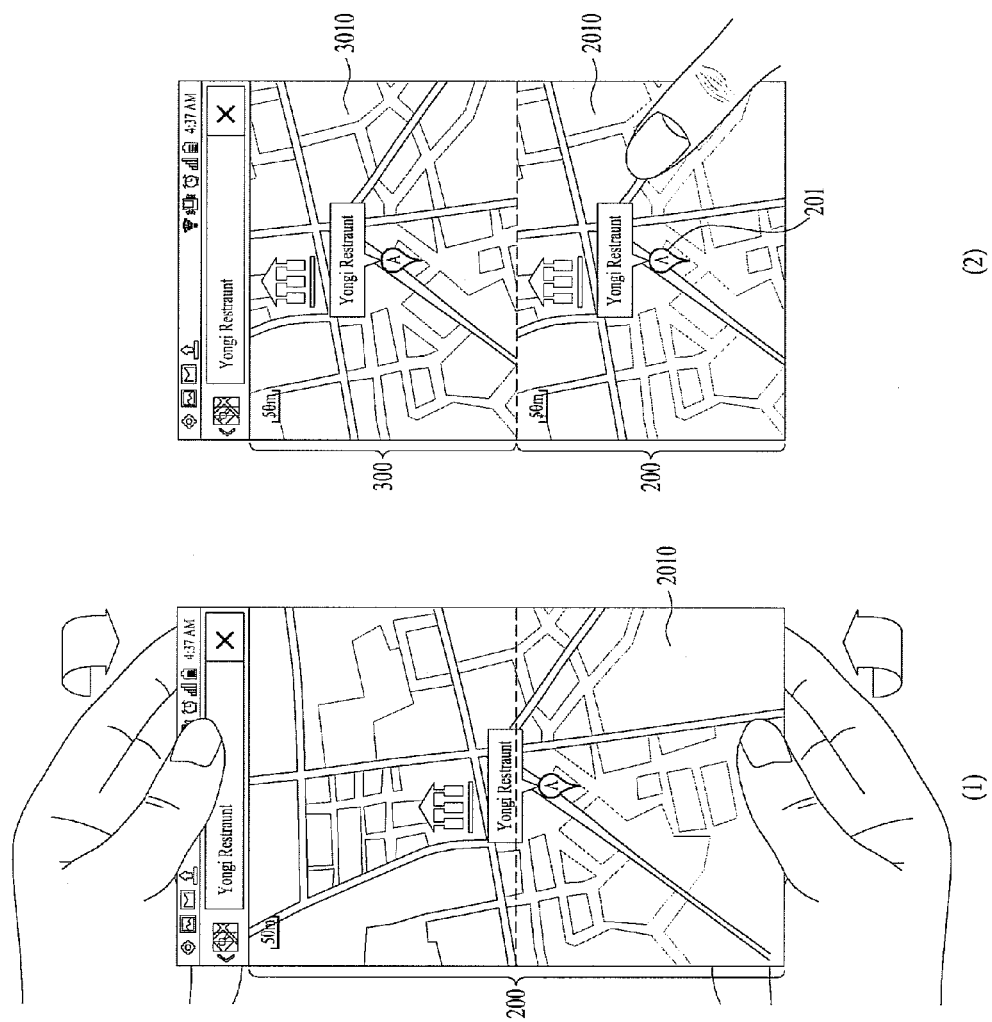
FIG. 7A and FIG. 7B are diagrams for examples of a $1^{st}$ touch gesture and a $2^{nd}$ touch gesture according to another embodiment.
Figure 7B:
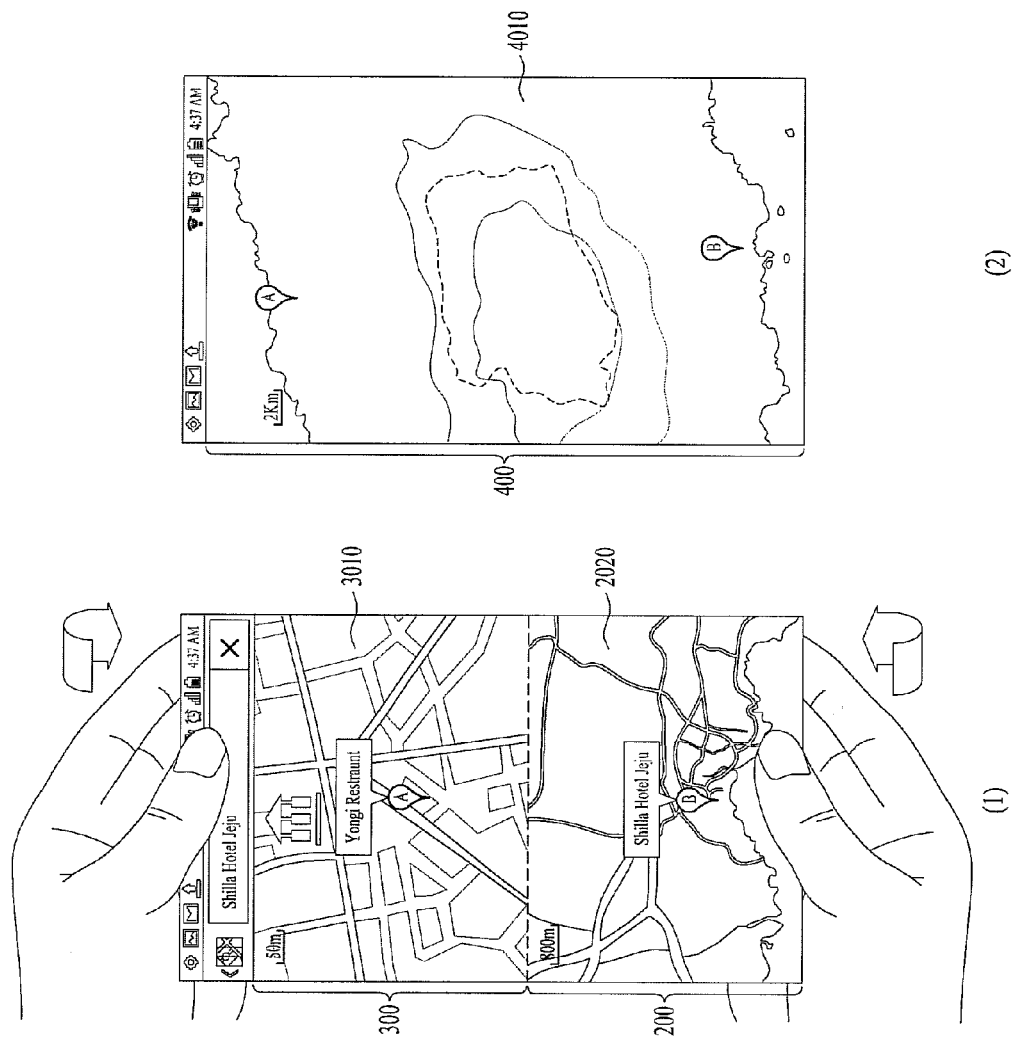

FIG. 7A and FIG. 7B show cases that a $1^{st}$ gesture 10 or a $2^{nd}$ gesture 20 is set to an action other than a touch input.

According to another embodiment of the present invention, the touchscreen 151 may include a flexible display. In this case, referring to FIG. 7A, the $1^{st}$ gesture 10 may be set to an action of folding the flexible display inward. Once a user folds the flexible display inward [FIG. 7A (1)], the controller 180 forms a $2^{nd}$ region 300 by recognizing the folding action as the $1^{st}$ gesture 10 and may then control at least one portion of a $1^{st}$ screen 2010 of a $1^{st}$ region at a timing point of folding the flexible display to be displayed as a $2^{nd}$ screen 3010 on the $2^{nd}$ region 300 [FIG. 7A (2)]. In doing so, the flexible display may include an OLED (organic light emitting diode) display.

The flexible display may include a flex (or bending) sensor configured to sense the folding action. In particular, the flex sensor is attached to the flexible display in a prescribed manner. When the flexible display is flexed, the attached flex sensor is flexed as well. The flexed flex sensor generates an electric signal amounting to a level of the flex and then forwards the electric signal to the controller 180. FIG. 22 shows one example of the flex sensor arranged structure applicable to the present embodiment.

Referring to FIG. 22 (a), a flex sensor 600 generally has a shape of a line or band. The flex sensor 600 may be able to measure a flex level using the principle that a resistance value varies depending on the flex level of the sensor. Normally, a resistance value is inversely proportional to a flex level. Within an operating range of a sensor, a resistance value relatively varies in proportion to a flex level. Using a variation of an electric signal depending on a variation of a resistance value, the controller 180 may be able to determine a flex level of the attached flexible display.

The flex sensors 600 may be arranged on both side ends of the flexible display 151 [FIG. 22 9B]]. Alternatively, the flex sensors 600 may be arranged in vertical direction in a manner of being regularly spaced apart from each other [FIG. 22 (c)]. Alternatively, the flex sensors 600 may be arranged in diagonal direction [FIG. 22 (d)]. In this case, 'arranging sensors' may mean that the sensors are directly attached to the flexible display or that the sensors are attached to such a means for fixing the flexible display thereto as a guide, a frame and the like.

In this specification, a flexed state of the flexible display is sensed using the flex sensor, by which the present invention may be non-limited. And, it is apparent to those skilled in the art that the present invention is applicable to any sensor capable of generating a different electric signal in accordance with a flex level.

If a plurality of sensors are arranged at different positions, respectively, the controller 180 may be able to determine a prescribed flexed state of a specific part of the flexible display by analyzing a signal indicating a flex level delivered from each of the sensors together with a corresponding position of the signal.

The arranged states shown in FIG. 22 are just exemplary. And, the arranged states may be modifiable in various ways in accordance with such a requirement as desired precision, exterior limitation and the like.

According to another embodiment, the flexible display may be able to detect the folding action using a touchpad included in the touchscreen 151 of the flexible display. For instance, if the touchpad is a depressurizing type, a plurality of depressurized points connected in a straight line to each other are generated by the folding action. If the controller 180 detects the contiguous depressurized points connected together in straight line, the controller 180 may be able to recognize it as the $1^{st}$ gesture 10.

In case that the touchscreen 151 includes a flexible display, referring to FIG. 7B, the $2^{nd}$ gesture 20 may be set to an action of folding the flexible display. In doing so, the $2^{nd}$ gesture 20 may be set to an action of folding the flexible display outward to be discriminated from the $1^{st}$ gesture 10. If a user folds the flexible display outward [FIG. 7B (1)], the controller 180 recognizes it as the $2^{nd}$ gesture 20, generates a merged screen 401, and then displays the merged screen 4010 on a $3^{rd}$ region 400 [FIG. 7B (2)].

FIG. 8 shows a case that two $2^{nd}$ regions 310 and 320 are formed by repeating a $1^{st}$ gesture 10 twice. FIGS. 9 to 12 show the cases that seven $2^{nd}$ regions 310, 320, 330, 340, 350, 360 and 370 are formed by repeating a $1^{st}$ gesture 10 seven times, respectively. In the following description, various embodiments for a case of forming a plurality of $2^{nd}$ regions by repeating a $1^{st}$ gesture 10 multiple times are explained with reference to FIGS. 8 to 12.

First of all, referring to FIG. 8, according to one embodiment, if a $1^{st}$ gesture 10 is detected repeatedly, the controller 180 may be able to form a plurality of $2^{nd}$ regions 310 and 320 to correspond to a detected count of the $1^{st}$ gesture 10. Referring to FIG. 8 (1), after a $1^{st}$ $2^{nd}$ region 310 has been formed by a $1^{st}$ gesture 10 performed previously, a user may be able to perform another $1^{st}$ gesture 10.

If the $2^{nd}$ $1^{st}$ gesture 10 is detected, referring to FIG. 8 (2), the controller additionally forms a $2^{nd}$ region 320 and then controls a changed screen 2020 of the $1^{st}$ region at the timing point of detecting the $2^{nd}$ $1^{st}$ gesture 10 to be displayed as a $2^{nd}$ screen 3020 on the additionally formed $2^{nd}$ region 320.

After the $2^{nd}$ $2^{nd}$ region 320 has been formed, if a touch input for commanding a search for 'Moi Café' is performed on the $1^{st}$ region 200, referring to FIG. 8 (3), the $1^{st}$ screen 2010 of the $1^{st}$ region may be changed again into a screen 2030 indicating a location of the 'Moi Café'. In this case, the $2^{nd}$ screen 3010 of the $1^{st}$ $2^{nd}$ region, the $2^{nd}$ screen 3020 of the $2^{nd}$ $2^{nd}$ region and the screen 2030 of the $1^{st}$ region are different from each other.

According to the present embodiment, if a plurality of the $2^{nd}$ regions 310 and 320 are formed, it may be able to search for more places in accordance with the number of the $2^{nd}$ regions 300 without changing or switching screens. In this case, since the controller 180 controls the respective regions separately, maps on different reduced scales may be independently searched for different places on the screens of the regions, respectively.

When the user repeatedly performs the $1^{st}$ gesture 10 several times, positions and sizes of a plurality of the formed $2^{nd}$ regions 310 and 320 may be previously set. In particular, the arrangement and size of each of the $2^{nd}$ regions 310 and 320 may be set previously in accordance with the number of the $2^{nd}$ regions 310 and 320 formed to correspond to the repeated count of the $1^{st}$ gesture 10.

For instance, in case that two $2^{nd}$ regions are formed, referring to FIG. 8 (2), the two $2^{nd}$ regions 310 and 320 and the $1^{st}$ region 200 may be previously set to be arranged in length direction of the touchscreen 151. For another instance, in case that seven $2^{nd}$ regions are formed, referring to FIG. 9, the seven $2^{nd}$ regions 310, 320, 330, 340, 350, 360 and 370 and the $1^{st}$ region 200 may be arranged in a checkerboard pattern on the touchscreen 151. In doing so, a size of each of a plurality of the $2^{nd}$ regions 310, 320, 330, 340, 350, 360 and 370 may be equal to or different from that of the $1^{st}$ size 200.

According to another embodiment, referring to FIG. 9, sizes of $2^{nd}$ regions 310, 320, 330, 340, 350, 360 and 370 may be changed by a user's manipulation. Referring to FIG. 9 (1), the seven $2^{nd}$ regions 310, 320, 330, 340, 350, 360 and 370 and the $1^{st}$ region 200 are formed contiguous with one another by the repetition of the $1^{st}$ gesture 10, thereby sharing boundaries with one another. In doing so, if a touch input of a specific pattern performed by a user is detected [FIG. 9 (2)], the controller 180 may be able to control sizes of some of the $2^{nd}$ regions 310 and 320 to be changed [FIG. 9 (3)].

In particular, the touch input of the specific pattern may include a touch input of an action performed in a manner of long touching the boundary of the $2^{nd}$ region 300 to change a size and then dragging, by which the present embodiment may be non-limited. The present embodiment may be non-limited by the case of a plurality of the $2^{nd}$ regions 310, 320, 330, 340, 350, 360 and 370 and the size of the $1^{st}$ region 200 may be changeable depending on the size changes of the $2^{nd}$ regions 310, 320, 330, 340, 350, 360 and 370. According to the present embodiment, a user is able to freely adjust the sizes of the $2^{nd}$ regions 310, 320, 330, 340, 350, 360 and 370, whereby user's convenience can be further enhanced.

Figure 10:
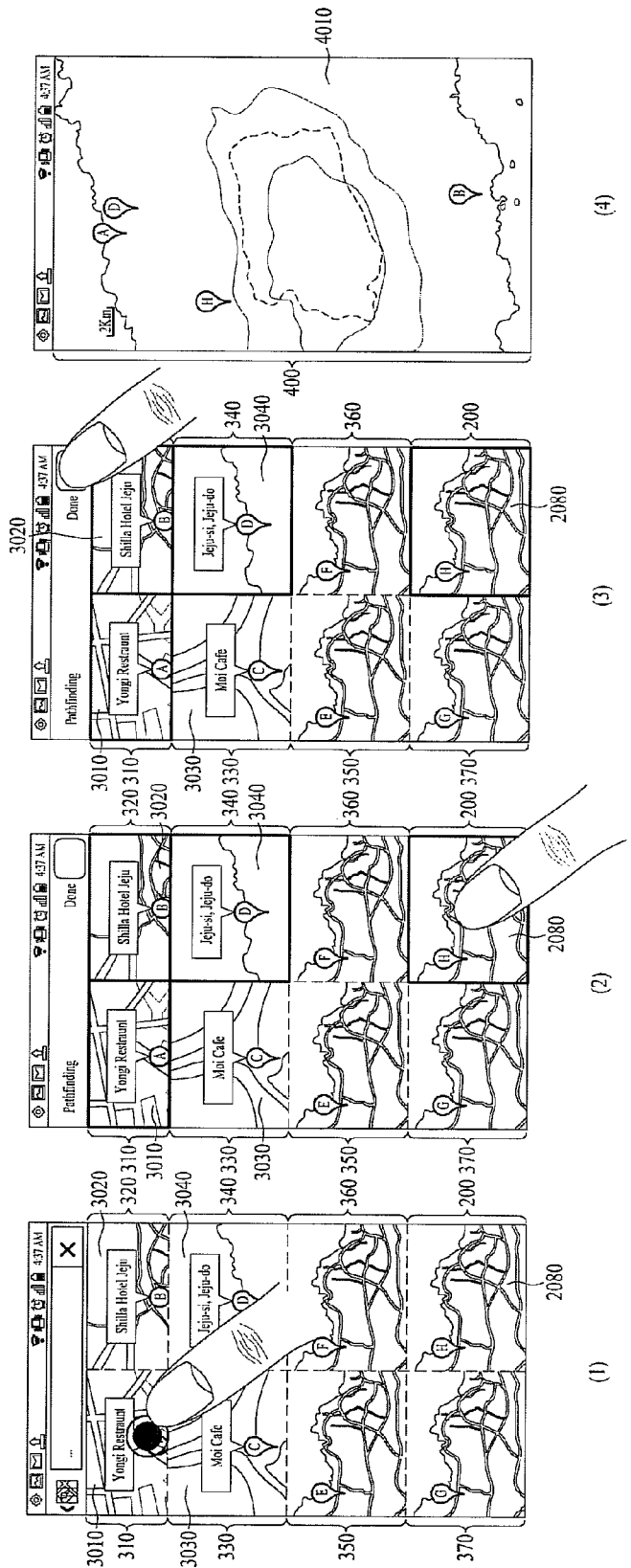
FIG. 10 is a diagram for one example of a case of selecting portions of a plurality of $2^{nd}$ regions together with a $1^{st}$ region and then merging the selected portions together.

According to another embodiment, in case that a plurality of $2^{nd}$ regions 310, 320, 330, 340, 350, 360 and 370 are formed, referring to FIG. 10, some of the $2^{nd}$ regions can be selected and merged by a user. In particular, the user may be able to select some regions 310, 320, 340 and 200 from a plurality of the regions formed on the touchscreen 151 by a touch input of a specific pattern. In this case, the touch input of the specific pattern may include a touch input of an action performed in a manner of activating a partial selection mode through a long touch performed on the touchscreen 151 [FIG. 10 (1)] and then touching the regions 310, 320, 340 and 200 to select [FIG. 10 (2)].

After the regions have been selected, if a touch input for ending a selected mode is performed by a selection of a tab 'Done' [FIG. 10 (3)], the controller 180 recognizes the touch input as a $2^{nd}$ gesture and may be then able to generate a merged screen 4010. In doing so, referring to FIG. (4), the controller 180 generates the merged screen 4010 including a $2^{nd}$ screen of the selected region and at least one portion (e.g., location information A, location information B, location information D and location information H) of each of the $3^{rd}$ screens 3010, 3020, 3040 and 2080 and may then control the generated merged screen 4010 to be displayed on a $3^{rd}$ region 400. In this case, the $3^{rd}$ region 40 may include a full region of the touchscreen 151.

Although FIG. 10 shows that the $1^{st}$ region 200 is selected together with some of a plurality of the $2^{nd}$ regions 300, some regions may be selected only from a plurality of the $2^{nd}$ regions 300 according to one embodiment. In this case, the controller 180 may be able to generate a merged screen 4010 including at least one portion of each of the $2^{nd}$ screens of the selected $2^{nd}$ regions without including the $3^{rd}$ screen 2080 of the $1^{st}$ region.

Through the above-described embodiments, a user is able to directly select a region on which a screen to be included in the merged screen is displayed. As a result, the merged screen 4010 optimal for an individual user can be generated. Since the user is able to generate the merged screen 400 by selecting a region corresponding to a screen indicating necessary information only, usability can be enhanced.

Figure 11:
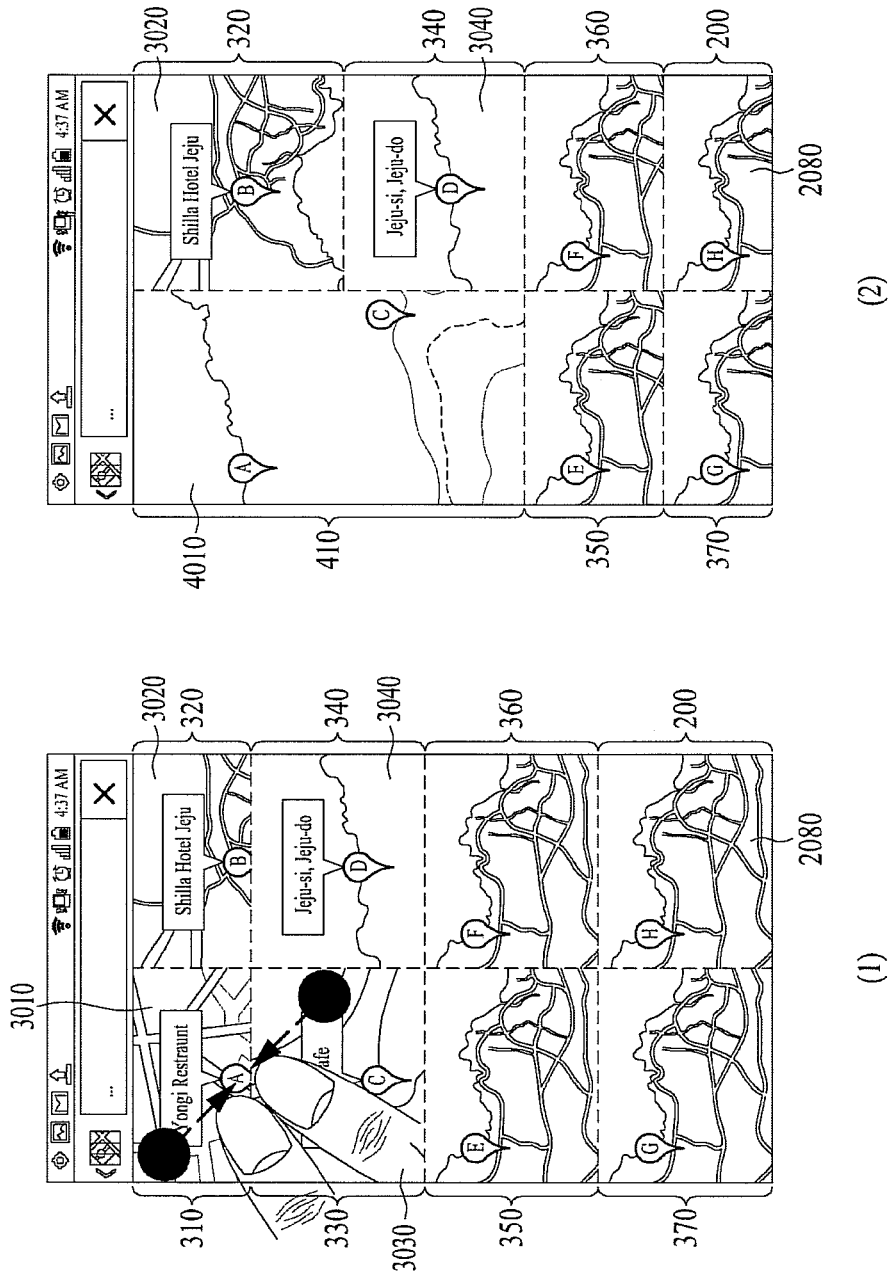
FIG. 11 and FIG. 12 are diagrams for various embodiments of a case of selecting a portion of each of a plurality of $2^{nd}$ regions and merging the selected portions together.
Figure 12:
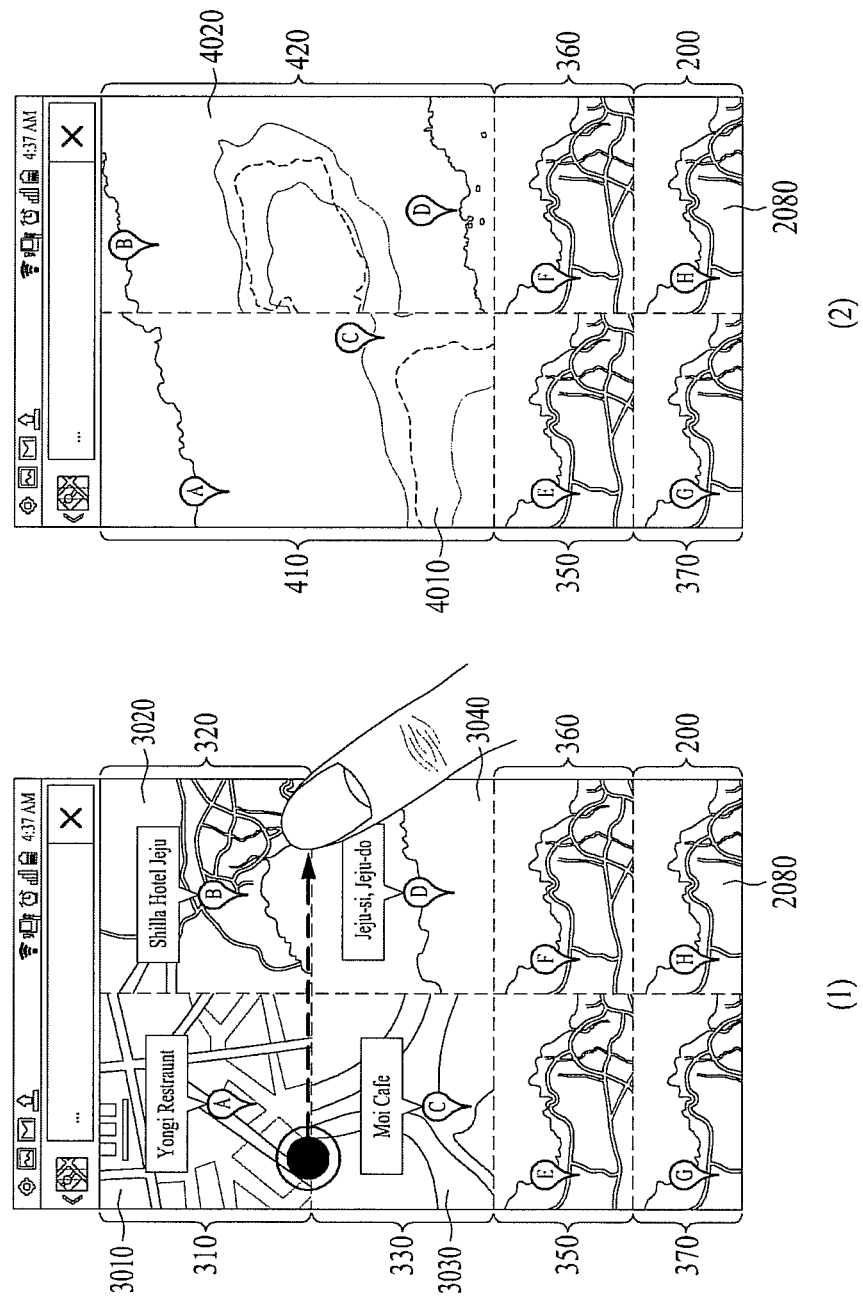

According to another embodiment, referring to FIG. 11 and FIG. 12, prescribed regions 310 and 330 may be merged together among a plurality of regions formed on the touchscreen 151.

For instance, referring to FIG. 11 (1), if a user performs a pinch-in touch input on prescribed regions 310 and 330 among a plurality of $2^{nd}$ regions, the prescribed regions 310 and 330 may be merged together. If the controller 180 detects the pinch-in input to the prescribed regions 310 and 330, the controller 180 recognizes the pinch-in input as a $2^{nd}$ gesture, generates a merged screen 4010 including at least one portions (location information A, location information C) of $2^{nd}$ screens 3010 and 3030 of the prescribed regions 310 and 330, and then controls the merged screen 4010 to be displayed on a region 410 generated from merging the prescribed regions 310 and 330 together [FIG. 11 (2)].

For another instance, referring to FIG. 12 (1), if a user performs an input of a touch & drag along one of boundaries of a plurality of $2^{nd}$ regions arranged contiguous with one another, the regions 310 and 330 sharing the boundary with each other or the regions 320 and 340 sharing the boundary with each other may be merged together.

If the controller 180 detects the above-mentioned touch drag input, the controller 180 recognizes the touch drag input as a $2^{nd}$ gesture and may be then able to independently merge the regions, which can be merged tougher, with each other by making the boundary disappear [FIG. 12 (2)]. In particular, the merged screen 4010 including portions (location information A, location information C) of the $2^{nd}$ screens 3010 and 3030 of the two left-top regions 310 and 330 may be displayed on the 2-region merged region 410 and the merged screen 4020 including portions (location information B, location information D) of the $2^{nd}$ screens 3020 and 3040 of the two right-top regions 320 and 340 may be displayed on the 2-region merged region 420.

In the above description, various embodiments are explained based on the case that the present invention is implemented on the active map application screen 5010. In the following description, cases of implementing a mobile terminal control of the present invention on a different job screen are explained with reference to FIGS. 13A to 14B.

Figure 13A:
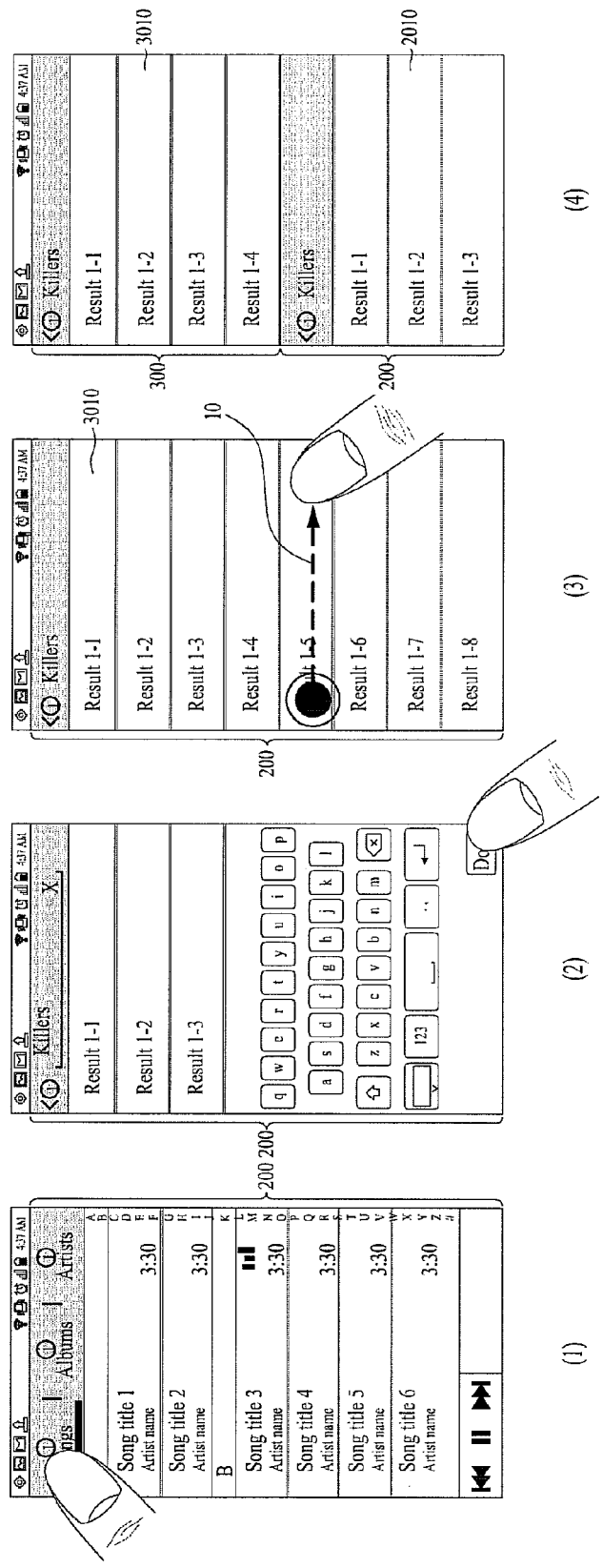
FIG. 13A and FIG. 13B are diagrams for a control flow in case of utilizing a control of a mobile terminal according to one embodiment of the present invention on a multimedia contents list screen.
Figure 13B:
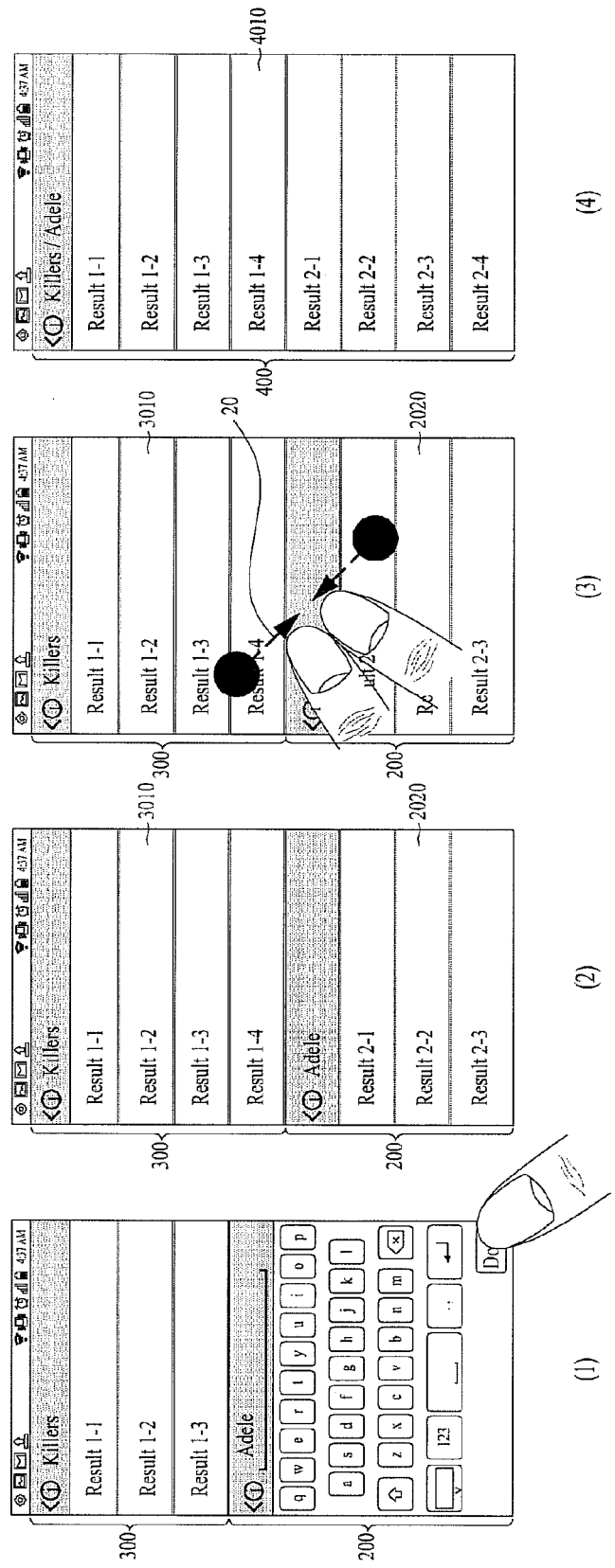

For instance, FIG. 13A and FIG. 13B show a case that the present invention is implemented on a multimedia contents search screen.

Referring to FIG. 13A (1) and FIG. 13A (2), a user may be able to search multimedia contents saved in a mobile terminal or multimedia contents on Internet through a multimedia contents list. For instance, the user may be able to search multimedia contents associated with a search word 'Killers'. As a result of the search, a list screen about 'Result 1-1, Result 1-2, Result 1-3' and the like may be displayed as a $1^{st}$ screen 2010 on a $1^{st}$ region 200. While the search result is displayed on the $1^{st}$ region 200, if a user performs a $1^{st}$ gesture 10 [FIG. 13A (3)], the controller 180 forms a $2^{nd}$ region 300 and may be then able to control the $1^{st}$ screen 2010 of the $1^{st}$ region at the timing point of performing the $1^{st}$ gesture 10 to be displayed as a $2^{nd}$ screen 3010 on the $2^{nd}$ region 300 [FIG. 13A (4)].

While the $2^{nd}$ region 300 is formed, the user may be able to change or switch the screen of the $1^{st}$ region to a $3^{rd}$ screen 2020 through a touch input. In this case, referring to FIG. 13B (1), the touch input may include an input for searching the multimedia contents saved in the mobile terminal or the multimedia contents on Internet for a multimedia content associated with a different search word 'Adele'. If the search input is performed, referring to FIG. 13B (2), the $1^{st}$ screen 2010 of the $1^{st}$ region may be changed into a $3^{rd}$ screen 2020 as a list screen for 'Result 2-1, Result 2-2, Result 2-3' and the like.

In doing so, referring to FIG. 13B (3), if the user performs a $2^{nd}$ gesture 20, the controller 180 generates a merged screen 4010 and may be then able to display the merged screen 4010. In this case, referring to FIG. 13B (4), the merged screen 4010 may include a list in which both of the search result screen 3010 for 'Killers' and the search result screen 2020 for 'Adele' are included.

Through the above-mentioned embodiment, various kinds of multimedia contents search results may be displayed on a single screen by being merged together. As a result, a user is able to conveniently check the search results through several steps at a time and is also able to view and compare the search results through several steps simultaneously.

Figure 14A:
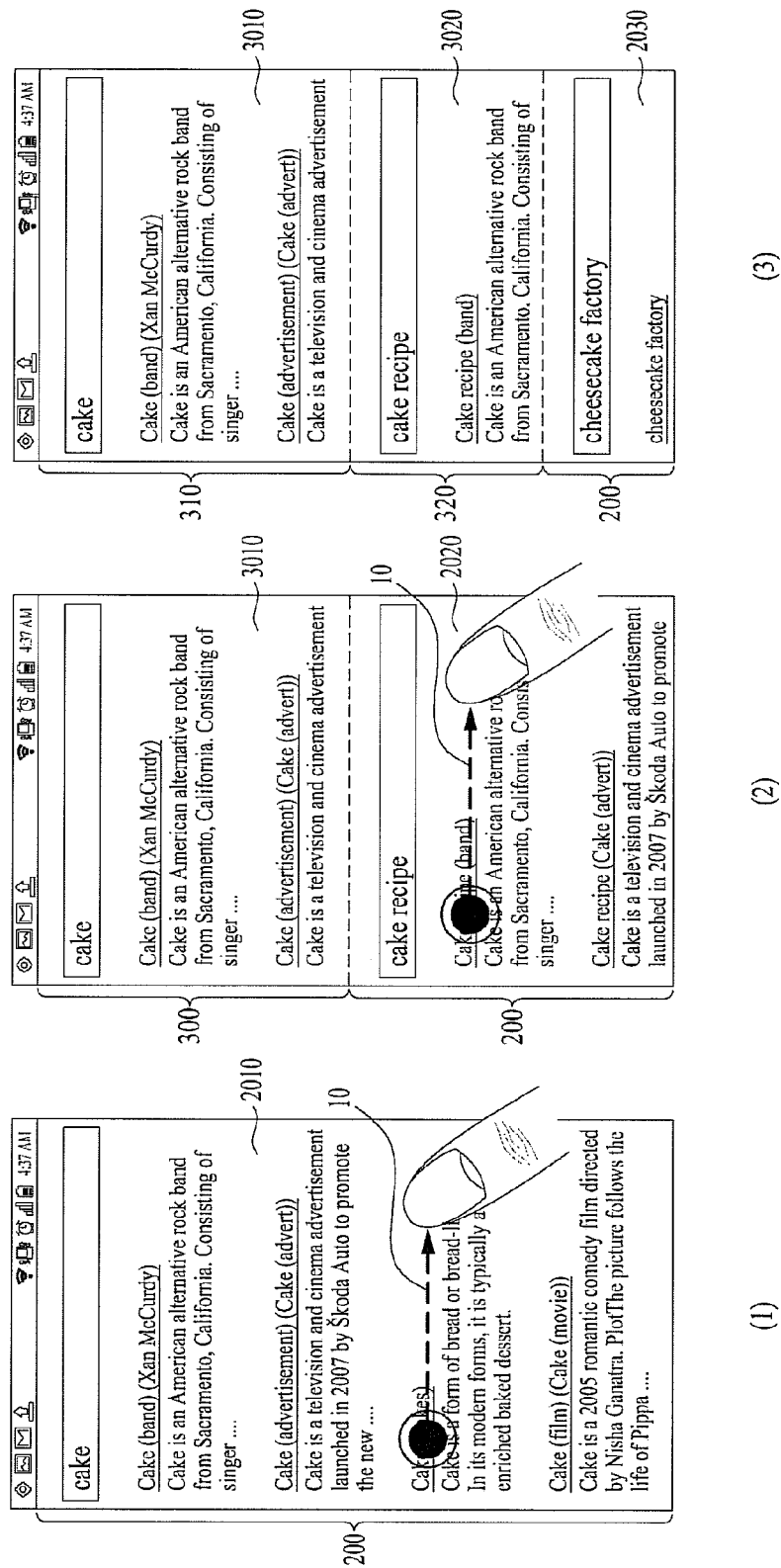
FIG. 14A and FIG. 14B are diagrams for a control flow in case of utilizing a control of a mobile terminal according to one embodiment of the present invention on an active web browser screen.
Figure 14B:
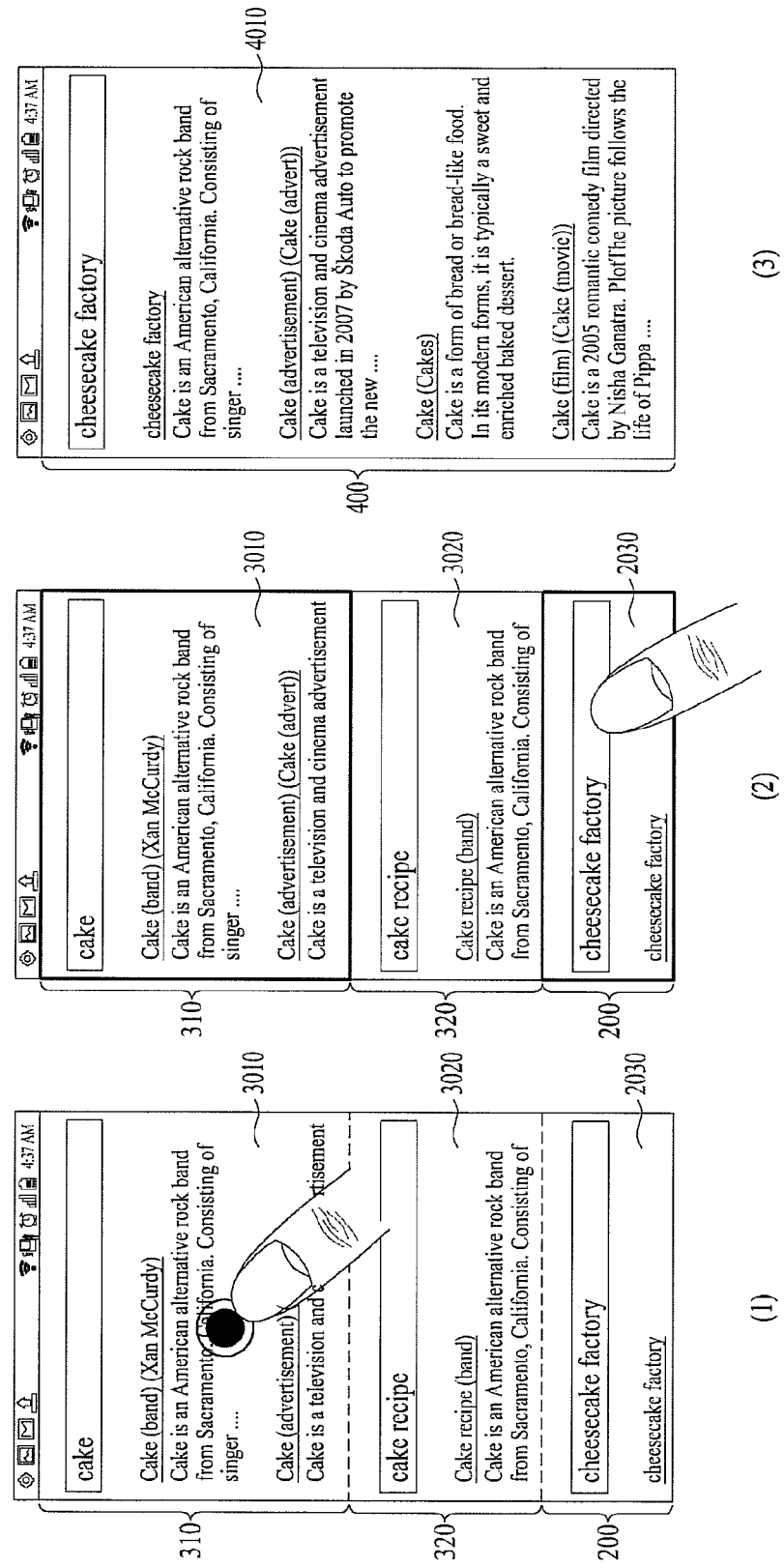

For another instance, FIG. 14A and FIG. 14B show a case that the present invention is implemented on a search engine search screen on web browser.

First of all, a user may be able to search a search engine for such a specific word as 'cake' using a web browser. While a web search result for 'cake' is displayed as a $1^{st}$ screen 2010 on a $1^{st}$ region 200, referring to FIG. 14A (1), the user may be able to perform a $1^{st}$ gesture 10. If the $1^{st}$ gesture 10 is detected, the controller 180 forms a $1^{st}$ $2^{nd}$ region 310 and may be then able to control the $1^{st}$ screen 2010 of the $1^{st}$ region at the timing point of detecting the $1^{st}$ gesture 10 to be displayed as a $2^{nd}$ screen 3010 on the $2^{nd}$ region 310.

As soon as the $2^{nd}$ region 310 is formed in response to the $1^{st}$ gesture 10, the controller 180 may be able to automatically perform a search job on the $1^{st}$ region 200 using one of the search words associated with the 'cake' in accordance with the formation of the $2^{nd}$ region 300 [FIG. 14A (2)]. In doing so, the controller 180 may be able to select an associated search word having highest relation from the associated search words of the 'Cake'. Referring to FIG. 14A (2), the controller 180 may be able to automatically change the $1^{st}$ screen 2010 of the $1^{st}$ region into a result screen 2020 by performing the search job. Alternatively, the user may be able to directly search the $1^{st}$ region 200 for 'cake recipe' that is the associated search word of the 'cake' [not shown in the drawing].

While the new search result screen 2020 is displayed on the $1^{st}$ region 200, the user may be able to perform the $1^{st}$ gesture 10 once more. If so, another $2^{nd}$ region 320 may be formed. As the $2^{nd}$ $2^{nd}$ region 320 is formed, the controller 180 automatically performs a search job using 'cheesecake factory' corresponding to one of other associated search words of the 'cake' and may be then able to change the screen 2020 of the $1^{st}$ region into a 'cheesecake factory' search result screen 2030 [FIG. 14A (3)]. In this case, the controller 180 is able to select an associated search word having a $2^{nd}$ highest relation. Alternatively, the user may be able to directly change the screen of the $1^{st}$ region 200 by performing a search using another associated search word.

While the two $2^{nd}$ regions 310 and 320 and the $1^{st}$ region 200 are formed [FIG. 14A], prescribed regions 310 and 200 may be selected by a specific touch input performed by a user. For instance, referring to FIG. 14B (1) and FIG. 14B (2), the $1^{st}$ $2^{nd}$ region 310 and the $1^{st}$ region 200 may be selected. In doing so, if the above-mentioned touch input is detected, the controller 180 recognizes the detected touch input as a $2^{nd}$ gesture and may be then able to generate a merges screen 4010.

In particular, the merged screen 4010 may include at least one portion of each of the $2^{nd}$ screen 3010 of the selected region 310 and the new result screen 2030 of the selected region 200. In this case, referring to FIG. 14B (3), the merged screen 4010 may be the result screen of the search performed using both of the search words 'cake' and 'cheesecake factory' respectively contained in the screens 3010 and 2030. To this end, the controller 180 performs a search on a search engine using all the search words respectively contained in the screens 3010 and 2030 of the regions selected in response to the touch input, generates a merged screen 4010 from the search result screen, and then displays the merged screen 4010.

According to the present embodiment, a user is able to view search results for various associated search words without changing or switching screens and is also able to effectively compare the search results to each other. Moreover, the user may be able to generate a merged screen 4010, which is a result screen of a new search performed by combining search words determined as necessary only, by a simple $2^{nd}$ gesture 20 only. As a result, after the search for the associated search word, the user may not need to perform an additional search job to obtain a more accurate search result, thereby enhancing the usability.

In the above description, the cases of implementing or utilizing the mobile terminal control of the present invention on the job screens using various kinds of applications are explained. In the following description, various embodiments for implementing the mobile terminal control according to the present invention on an image viewer screen are explained with reference to FIGS. 15A to 19.

Figure 15A:
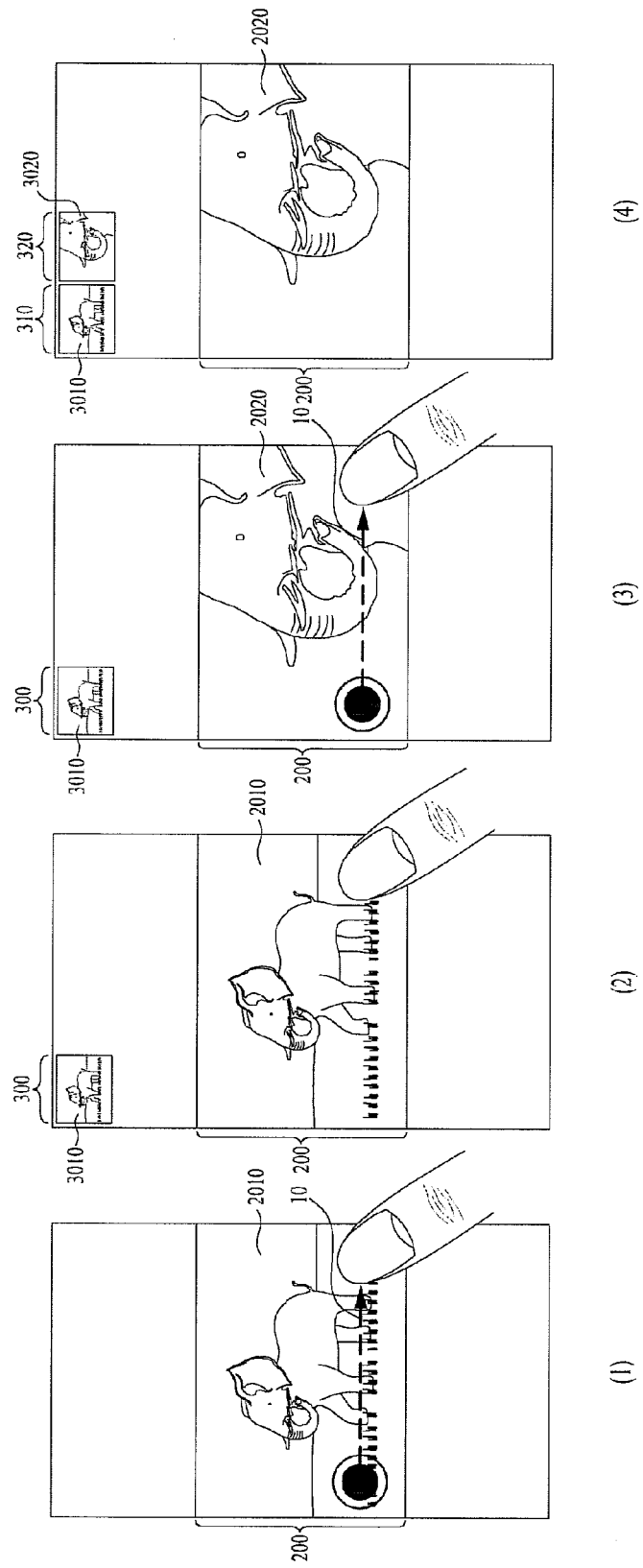
FIG. 15A and FIG. 15B are diagrams for a control flow in case of utilizing a control of a mobile terminal according to one embodiment of the present invention on an active image viewer screen.
Figure 15B:
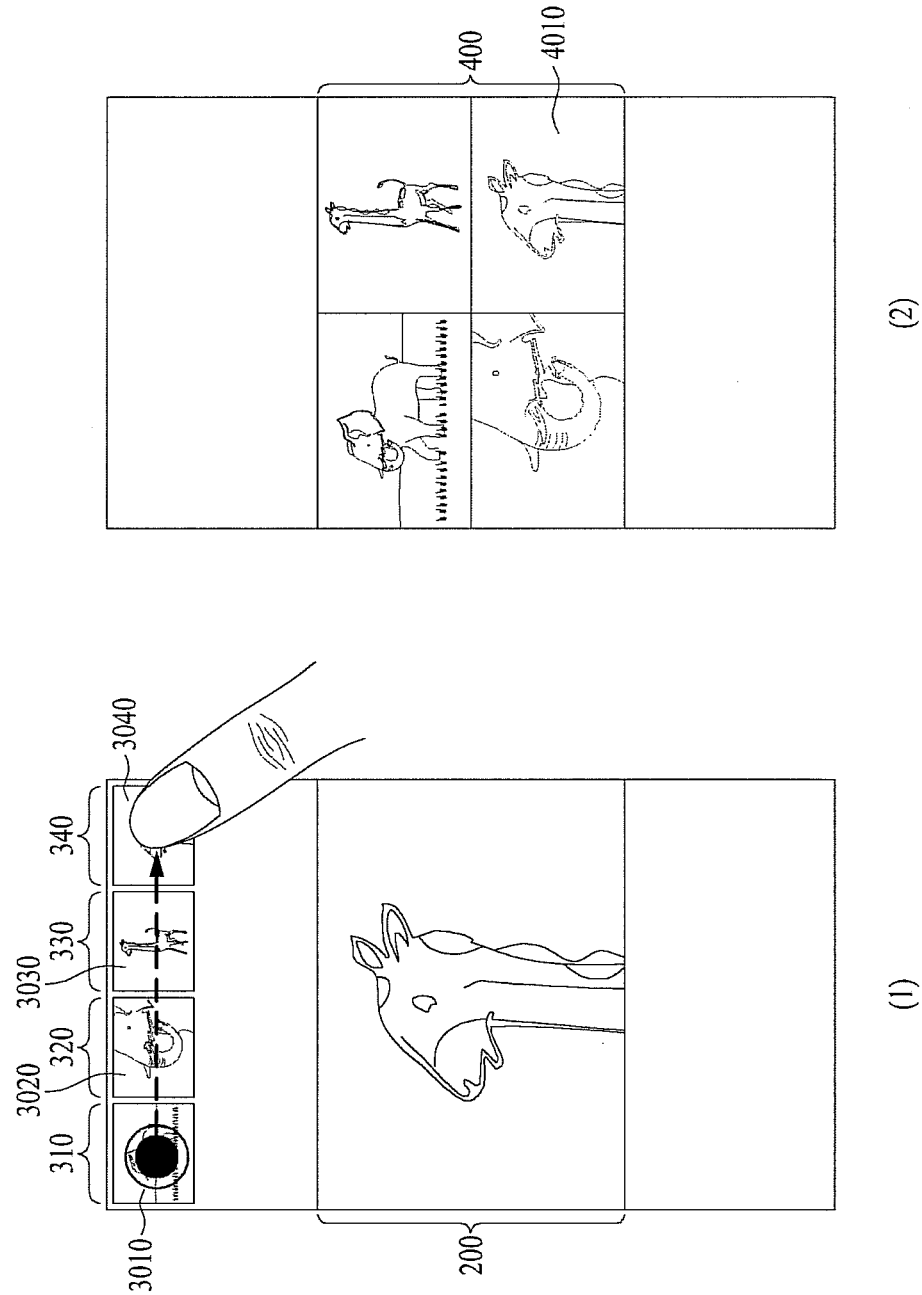

FIG. 15A and FIG. 15B show a case that the present invention is implemented on an active image viewer screen.

Referring to FIG. 15A (1), while an image viewer application is active, an image may be displayed as a $1^{st}$ screen 2010 on a $1^{st}$ region 200 occupying a portion of the touchscreen 151. If a user performs a $1^{st}$ gesture 10, referring to FIG. 15A (2), the controller 180 forms a $2^{nd}$ region 300 on a top end of the touchscreen 151 and may then control the $1^{st}$ screen 2010 of the $1^{st}$ region at the timing point of detecting the $1^{st}$ gesture 10 to be displayed as a $2^{nd}$ screen 3010 on the $2^{nd}$ region 300. In doing so, a size of the $2^{nd}$ region 300 may be set smaller than that of the $1^{st}$ region 200, as shown in the drawing, and the screen of the $2^{nd}$ region 300 may play a role as a sort of a thumbnail for the $1^{st}$ screen 2010 of the $1^{st}$ region 200 at a specific timing point.

While one $2^{nd}$ region 310 is formed, the user may be able to change or switch the screen of the $1^{st}$ region 200 to a $3^{rd}$ screen 2020 through a touch input. For instance, the user may intend to view an image displayed on the $1^{st}$ region 200 by enlarging a portion of the corresponding image. If the user performs a touch input for enlarging an image on the $1^{st}$ region 200, referring to FIG. 15A (3), the $1^{st}$ screen 2010 corresponding to an original screen may be changed into the $3^{rd}$ screen 2020 corresponding to an enlarged screen. In doing so, if any manipulation is not performed on the $2^{nd}$ region 300, the $2^{nd}$ screen 3010 of the $2^{nd}$ region 300 may be maintained as it is.

While the screen of the $1^{st}$ region 200 is changed, as mentioned in the above description, if another $1^{st}$ gesture 10 is performed [FIG. 15A (3)], the controller 180 forms a $2^{nd}$ $2^{nd}$ region 320 and may then control the $3^{rd}$ screen 2020 of the 1st region 200 to be displayed on the $2^{nd}$ $2^{nd}$ region 320 [FIG. 15A (4)].

In doing so, according to one embodiment, if a $1^{st}$ gesture 10 is detected, the controller 180 forms the $2^{nd}$ region 320 in response to the $1^{st}$ gesture 10 and simultaneously enables the $3^{rd}$ screen 2020 to be changed into the $1^{st}$ screen 2010 on the $1^{st}$ region 200. And, the corresponding embodiment is shown in FIG. 16.

Figure 16:
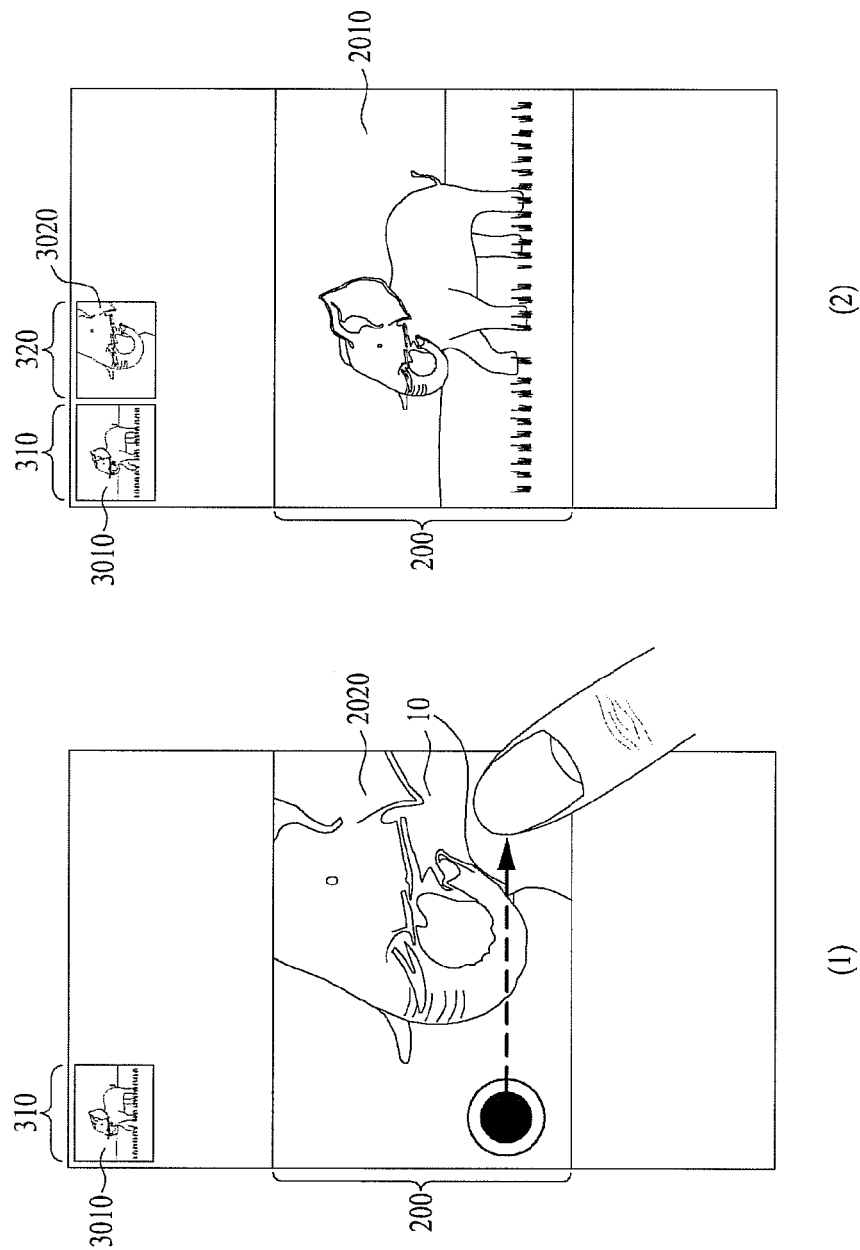
FIG. 16 and FIG. 17 are diagrams for examples of various embodiments of a screen change of a $1^{st}$ region displayed in response to a $1^{st}$ gesture.

Referring to FIG. 16 (1), while the image screen 2020 enlarged by the user's touch input is displayed on the 1st region 200, a $1^{st}$ gesture 10 may be performed. In this case, the control 180 forms a $2^{nd}$ region 320, controls the enlarged image screen 2020 to be displayed on the $2^{nd}$ region 320, and enables the image screen 2010 before the enlargement to be simultaneously displayed on the $1^{st}$ region 200 [FIG. 16 (2)]. The controller 180 may be able to cancel only one screen change performed on the $1^{st}$ region 200 right before the $1^{st}$ gesture 10 is performed. Alternatively, in order for the screen of the $1^{st}$ region 200 to be displayed as initially displayed, the controller 180 may be able to cancel all screen changes performed on the $1^{st}$ region 200 before the $1^{st}$ gesture 10 is performed.

Referring now to FIG. 15A, while the two $2^{nd}$ regions 300 are formed [FIG. 15A (4)], if the $1^{st}$ gesture 10 is repeatedly performed, more $2^{nd}$ regions 310, 320, 330 and 340 can be formed [FIG. 15B (1)]. In doing so, if a $2^{nd}$ gesture 20 is performed on the touchscreen 151, the controller 180 generates a merged screen 4010, in which at least one portions of the $2^{nd}$ screens 3010, 3020, 3030 and 3040 of the $2^{nd}$ regions 310, 320, 330 and 340 are included, and may then control the merged screen 4010 to be displayed on a $3^{rd}$ region 400.

In particular, the $2^{nd}$ gesture 20 may include an input of touching and dragging a top side of the touchscreen 151, on which the $2^{nd}$ regions 310, 320, 330 and 340 are formed [FIG. 15B (1)]. And, the merged screen 4010 may include a new synthesized image in which the images of the $2^{nd}$ regions 310, 320, 330 and 340 and the image of the $1^{st}$ region 200 are included all [FIG. 15B (2)].

According to the present embodiment, even if a user keeps changing a display state of an image while viewing the image displayed on the $1^{st}$ region 200, an image in an intermediate state is separately saved in the $2^{nd}$ region 300. Hence, it may be unnecessary for the user to perform the same job to view the image in the intermediate state again. Moreover, since a new merged screen 4010 including all images in intermediate states can be formed in response to a simple gesture, user's convenience can be enhanced.

Figure 17:
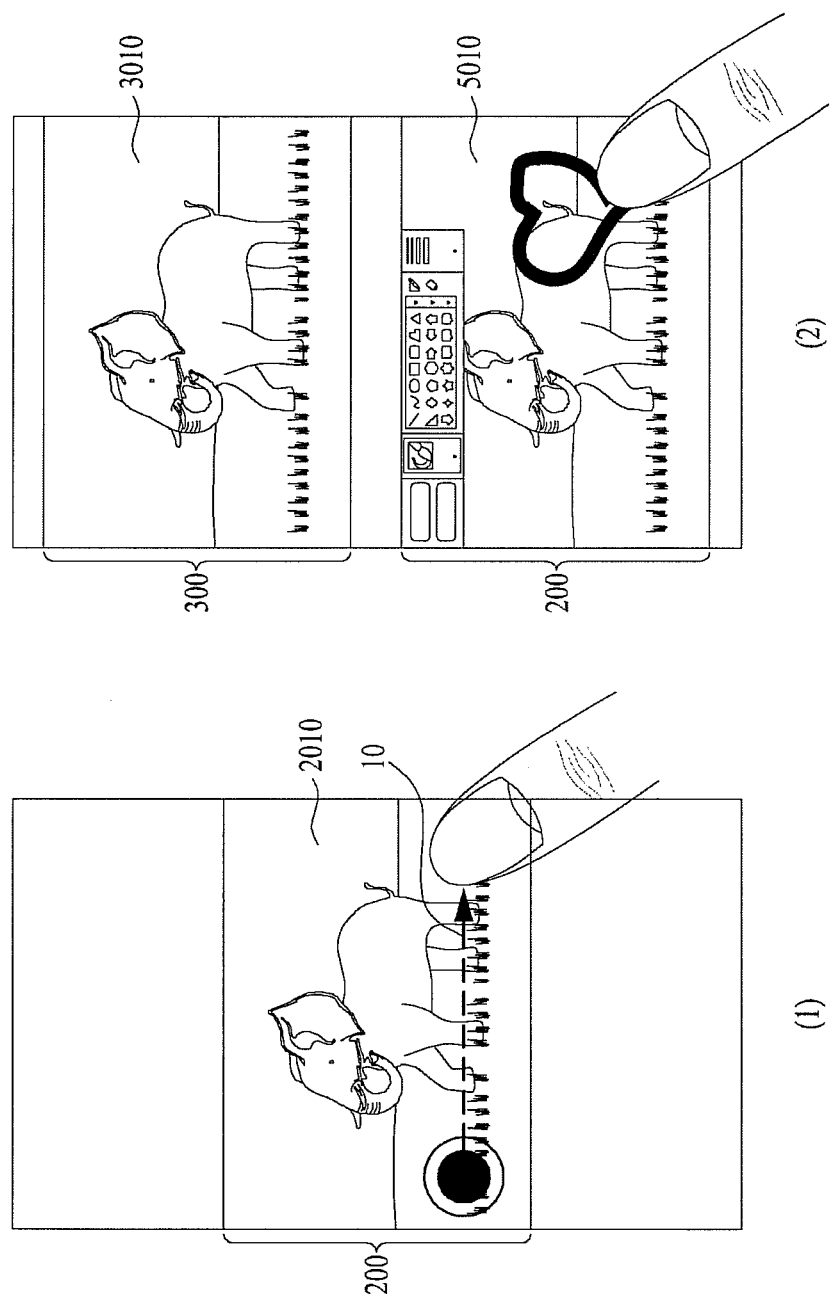

According to another embodiment, referring to FIG. 17, if a $1^{st}$ gesture 10 is detected, the controller 180 forms a $2^{nd}$ region 300 in response to the $1^{st}$ gesture 10, activates an application in the $1^{st}$ region 200 simultaneously and automatically, and controls an active screen of the application to be displayed on either the $1^{st}$ region 200 or the $2^{nd}$ region 300. In this case, the application may correspond to a content contained in a $1^{st}$ screen 2010 of the $1^{st}$ region 200. For instance, in case that the content contained in the $1^{st}$ screen 2010 of the $1^{st}$ region 200 is an image, the application may include an image editing application.

In particular, while the image is displayed as the $1^{st}$ screen 2010 on the $1^{st}$ region 200, if a user performs a $1^{st}$ gesture 10 [FIG. 17 (1)], the controller 180 forms a $2^{nd}$ region 300 and may then control the image of the $1^{st}$ screen 2010 to be displayed on the $2^{nd}$ region 300 [FIG. 17 (2)]. Simultaneously, the controller 180 automatically activates the image editing application, displays an active screen 5010 of the image editing application on the $1^{st}$ region 200, and enables the user to edit the image on the $1^{st}$ region 200. FIG. 17 shows the case that the active image editing application screen 5010 is displayed on the $1^{st}$ region 200. Alternatively, the controller 180 forms the $2^{nd}$ region 300 and may then control the active screen of the application to be displayed on the $2^{nd}$ region 300 instead of the $1^{st}$ screen 2010 of the $1^{st}$ region 200.

According to the present embodiment, a user may be able to manipulate an active application screen 5010, which uses a content, while viewing an original copy of the content. Moreover, the user may be able to conveniently compare the original copy of the content to the active application screen 5010.

Figure 18:
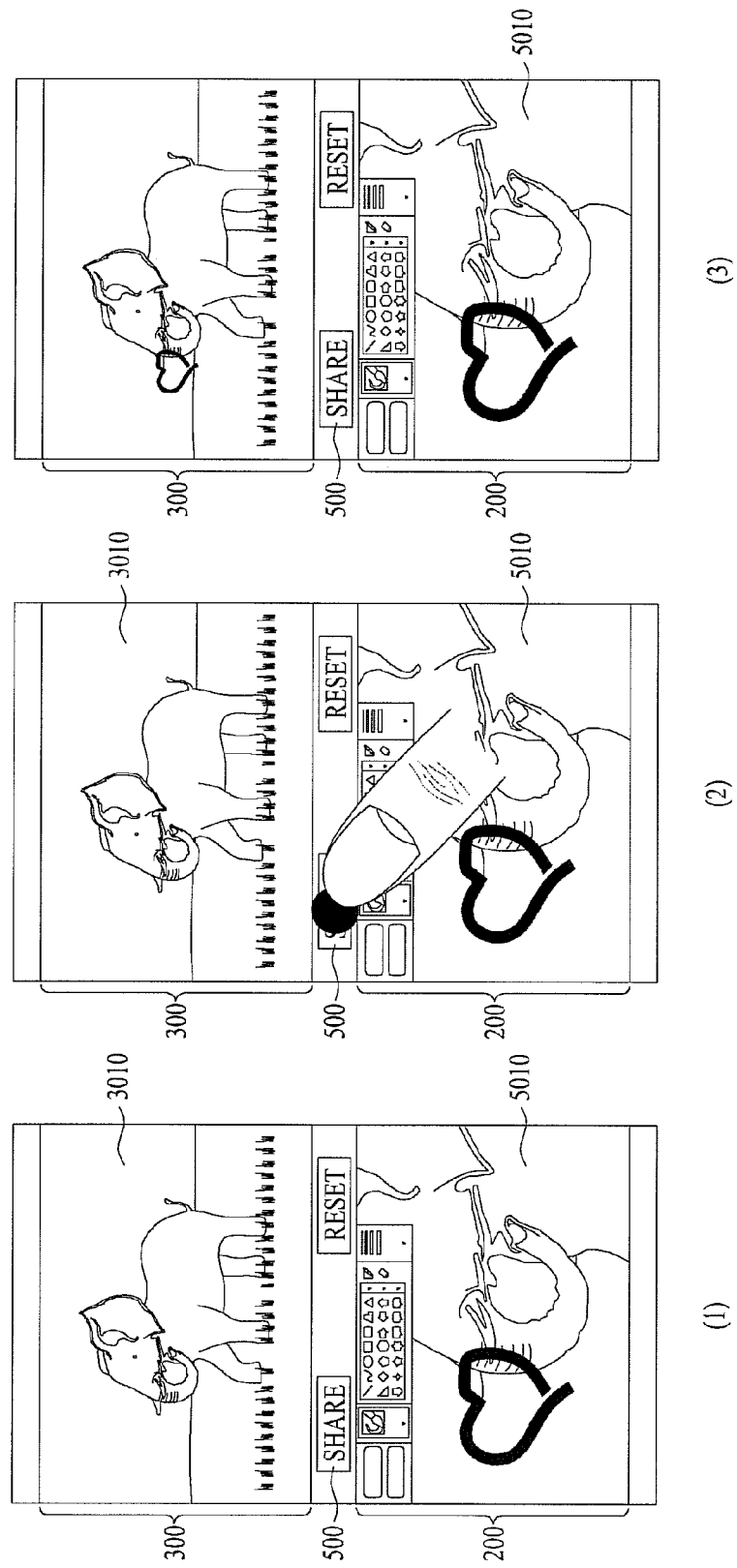
FIG. 18 and FIG. 19 are diagrams for examples of various embodiments of linking a screen of a $1^{st}$ region and a screen of a $2^{nd}$ region with each other in case of changing the screen of the $1^{st}$ region in association with the embodiment shown in FIG. 17.

According to one embodiment, as mentioned in the above description, if the active application screen 5010 included in the screen of the $1^{st}$ region 200 by the $1^{st}$ gesture 10 is displayed on the touchscreen 151, referring to FIG. 18, at least one tap region 500 may be formed between the $1^{st}$ region 200 and the $2^{nd}$ region 300. In particular, if the tab region 500 is touched, it may be able to link the $1^{st}$ screen 2010 of the $1^{st}$ region 200 or the $2^{nd}$ screen 3010 of the $2^{nd}$ region 300 to the active application screen 5010.

In more particular, referring to FIG. 18 (1), if the controller 180 activates an image editing application in response to the $1^{st}$ gesture 10 and then displays the corresponding active screen 5010 on the $1^{st}$ region 200, a user may be able to edit the image of the $1^{st}$ region 200 using the corresponding application. According to the present embodiment, a tab 'SHARE' and a tab 'RESET' may be formed between the $1^{st}$ region 200 and the $2^{nd}$ region 300. In this case, the tab 'SHARE' enables the $2^{nd}$ screen 3010 to reflect an edited item in the active image editing application screen 5010 and the tab 'RESET' enables the active image editing application screen 5010 to be identical to the $2^{nd}$ screen 3010.

When the item 201 edited in the active application screen 5010 is reflected by the $2^{nd}$ screen 3010, referring to FIG. 18 (3), even if the image of the $1^{st}$ region and the image of the $2^{nd}$ region 300 are displayed at different ratios, respectively, the edited item may be reflected irrespective of the image display state.

According to another embodiment, as mentioned in the foregoing description, if the active application screen 5010 is displayed on the $1^{st}$ region 200 by the $1^{st}$ gesture 10, it may be able to generate a screen, in which an item modified in the active application screen 5010 using an application is reflected by another screen 3010 using an action of folding the touchscreen 151 including the flexible display, into a merged screen 4010.

Figure 19:
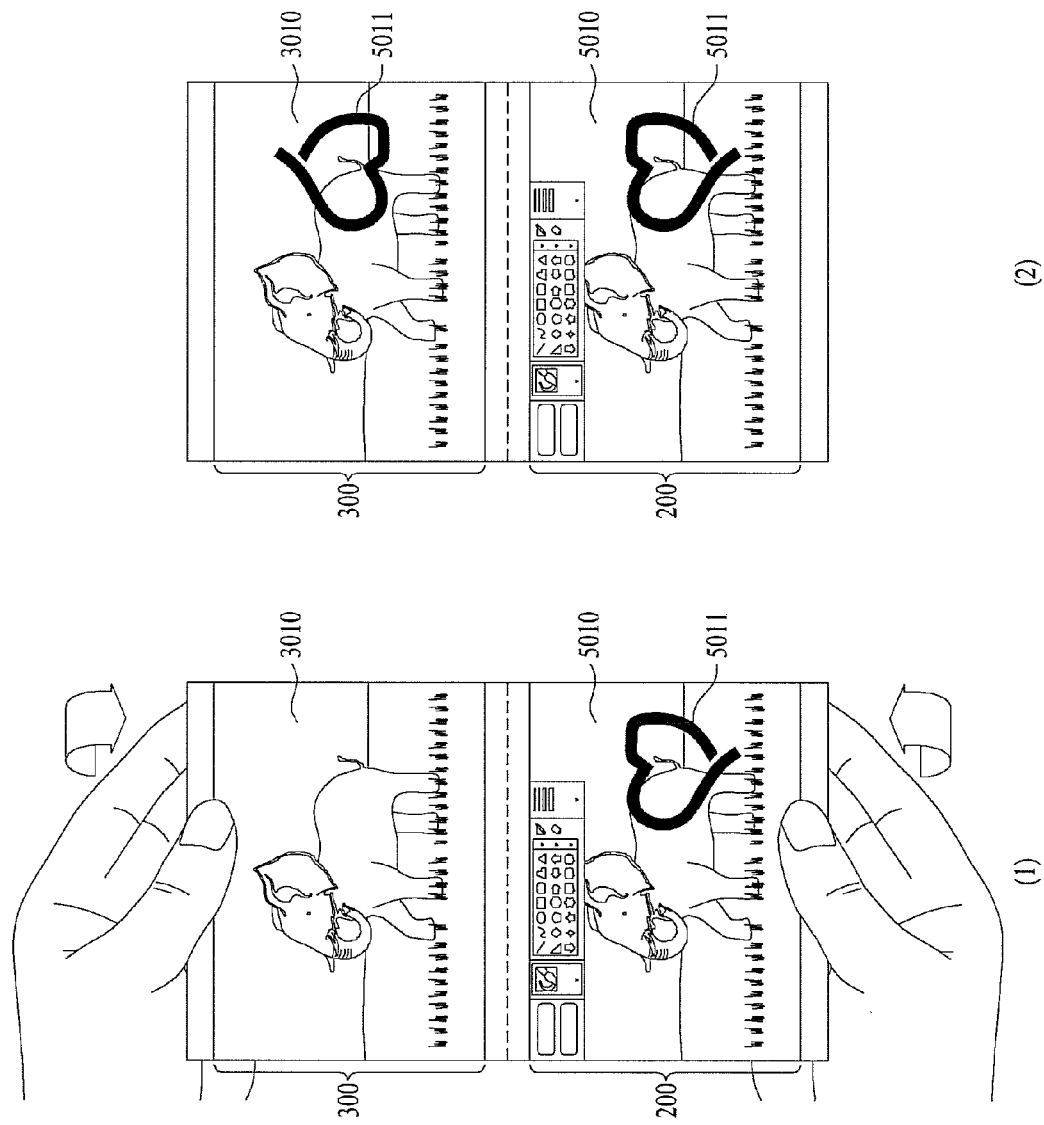

In particular, referring to FIG. 19 (1), if the controller 180 activates an image editing application in response to the $1^{st}$ gesture 10 and then displays an active screen 5010 of the image editing application on the $1^{st}$ region 200, a user may be able to edit the image of the $1^{st}$ region 200 using the corresponding application. For instance, the user may be able to add an object 5011 of a heart shape to the screen of the $1^{st}$ region 200.

Subsequently, if the user enables the active application screen 5010 and the $2^{nd}$ screen 3010 to come in contact with each other by folding the touchscreen 151 including the flexible display inward, as shown in FIG. 19 (1), the controller 180 may be able to generate a merged screen 4010 by recognizing the folding action as a $2^{nd}$ gesture.

In this case, the merged screen 4010 may include a screen in which the object 5011 added to the active application screen 5010 by editing and at least one portion of the $2^{nd}$ screen 3010 are included. In doing so, the added object reflected part of the $2^{nd}$ screen 3010 may correspond to a part at which the added object 5011 comes in physical contact with the $2^{nd}$ screen 3010 by the flexible display folding action.

As a result, referring to FIG. 19 (2), a screen, in which a shape symmetric to the heart shape object 201 added to the active application screen 5010 is added to a symmetric part of the $2^{nd}$ screen 3010, may be generated as a merged screen 4010. In this case, the merged screen 4010 may be displayed on a $3^{rd}$ region 400 equal to the $2^{nd}$ region 300.

In the above description, various embodiments for the controller 180 to generate and display the merged screen 4010 in response to the $2^{nd}$ gesture are explained. In the following description, a case for the controller 180 to re-display a $2^{nd}$ screen 3010 on a $1^{st}$ region 200 in response to a $2^{nd}$ gesture is explained with reference to FIGS. 20 to 21B.

Figure 20:
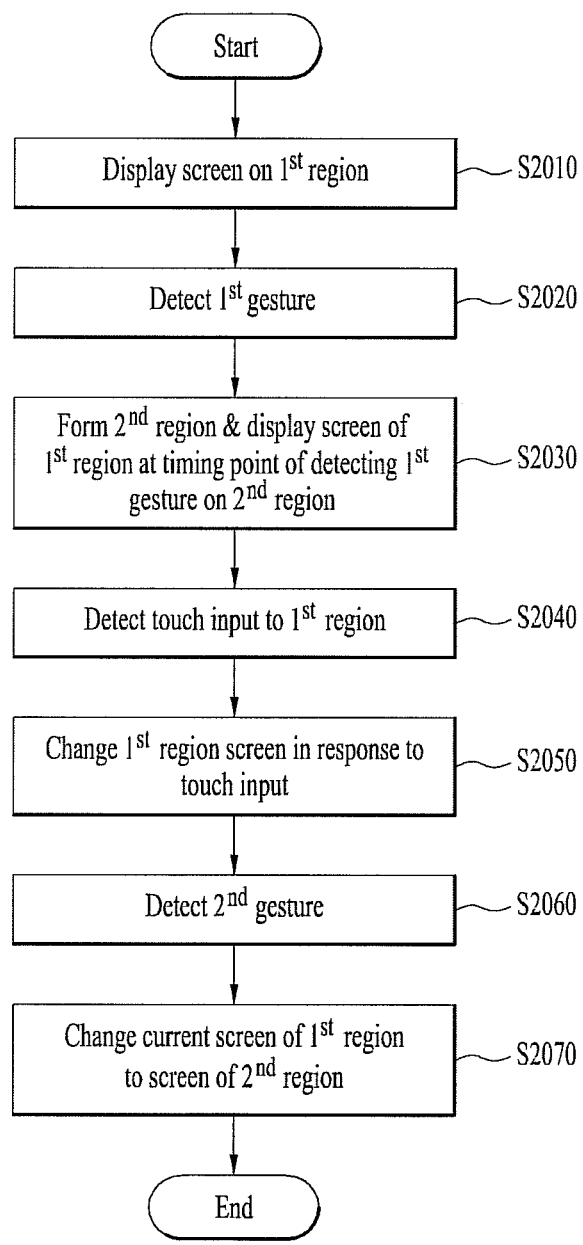
FIG. 20 is a flowchart for a method of controlling a mobile terminal according to another embodiment of the present invention.

FIG. 20 is a flowchart for a method of controlling a mobile terminal according to another embodiment of the present invention.

Referring to FIG. 20, a $1^{st}$ screen 2010 is displayed on a $1^{st}$ region 200 of a touchscreen 151 of a mobile terminal [S2010]. While the $1^{st}$ screen 2010 is displayed on the $1^{st}$ region 200, if a $1^{st}$ gesture 10 is detected [S2020], the controller 180 forms a $2^{nd}$ region 300 and then controls the $1^{st}$ screen 2010 of the $1^{st}$ region 200 at the timing point of detecting the $1^{st}$ gesture 10 to be displayed as a $2^{nd}$ screen 3010 on the $2^{nd}$ region 300 [S2030].

After the $2^{nd}$ region 300 has been formed, if a touch input to the $1^{st}$ region 200 is detected [S2040], the controller 180 may change the screen of the $1^{st}$ region 200 into a $3^{rd}$ screen 2020 in response to the touch input [S2050]. In doing so, as mentioned in the foregoing description, the controller 180 may be able to automatically change the $1^{st}$ screen 2010 into the $3^{rd}$ screen 2020 without the touch input as the $2^{nd}$ region 300 is formed. The above-described steps are identical to the former steps described with reference to FIG. 4 and its details shall be omitted from the following description.

After the screen of the $1^{st}$ region 200 has been changed, if a user performs a $2^{nd}$ gesture, the mobile terminal detects the $2^{nd}$ gesture [S2060]. Preferably, the $2^{nd}$ gesture may include an action of a touch input to select the $2^{nd}$ region 300. In particular, referring to FIG. 21A (1), the $2^{nd}$ gesture may include a tab input for selecting one region 320 from a plurality of $2^{nd}$ regions 310, 320, 330 and 340. In this case, each of a plurality of the $2^{nd}$ regions 310, 320, 330 and 340 may include a differently displayed image of a single image or a copied image of a screen of the $1^{st}$ region 200 in a different image displayed state. Alternatively, the $2^{nd}$ gesture may include a touch drag input performed in a manner of touch & drag performed on a plurality of the $2^{nd}$ regions 310, 320, 330 and 340 at a time [cf. FIG. 21B], by which the $2^{nd}$ gesture of the present embodiment may be non-limited.

Once the above-mentioned $2^{nd}$ gesture is detected, the controller 180 may be able to change the current $3^{rd}$ screen 2040 of the $1^{st}$ region into a screen 3020 of the $2^{nd}$ region 320 [S2070]. When the $2^{nd}$ region 320 is formed, the same screen of the $1^{st}$ region 200 is copied. Yet, as the screen of the $1^{st}$ region 200 is changed into the $3^{rd}$ screen 2040, the screen of the $1^{st}$ region 200 becomes different from the screen of the $2^{nd}$ region 320. In doing so, if the $2^{nd}$ gesture is performed, referring to FIG. 21A (2), the controller 180 changes the $3^{rd}$ screen 2040 of the $1^{st}$ region 200 with reference to the $2^{nd}$ screen 3020 in order to display the $2^{nd}$ screen 3020 of the $2^{nd}$ region 320 to be displayed on the $1^{st}$ region 200.

According to the present embodiment, a user copies a pre-change screen and saves the copied screen in at least one of the $2^{nd}$ regions 310, 320, 330 and 340. Thereafter, the user may be able to control the pre-change screen to be re-displayed on the $1^{st}$ region 200 through a simple gesture. As a result, when the user changes a display state of a single screen or performs a series of editing jobs, it may be unnecessary to save the display state of each step separately. And, the user may be able to change the screen of the $1^{st}$ region 200 while the screen of the $1^{st}$ region 200 is simultaneously displayed, whereby usability can be enhanced.

According to one embodiment, as mentioned in the above description, in case that the screen of the $1^{st}$ region 200 is identically changed into the screen of the $2^{nd}$ region 300 by a $2^{nd}$ gesture, the $2^{nd}$ gesture may include an action of selecting a plurality of the $2^{nd}$ regions 310, 320, 330 and 340 simultaneously. For instance, referring to FIG. 21B (1), the $2^{nd}$ gesture may include an input of a touch &drag performed on a plurality of the $2^{nd}$ regions 310, 320, 330 and 340 formed on the top end of the touchscreen 151. In doing so, the controller 180 changes the $3^{rd}$ screen 2020 of the $1^{st}$ region 200 into screens 3010, 3020, 3030 and 3040 of the selected $2^{nd}$ regions 310, 320, 330 and 340. In particular, in order for the screens 3010, 3020, 3030 and 3040 to be displayed on the $1^{st}$ region 200 in sequence, the controller 180 may control a slide show to be displayed on the $1^{st}$ region 200 [FIG. 21B (2), FIG. 21B (3)].

Accordingly, embodiments of the present invention provide various effects and/or features.

According to at least one of embodiments of the present invention, although a user changes a display state of a screen of a $1^{st}$ region or performs a different job on the $1^{st}$ region, a previously viewed screen is displayed on a $2^{nd}$ region together with the screen of the $1^{st}$ region, thereby facilitating a user to recognize screens of prescribed views or timing points in the course of performing a series of jobs. The user needs not to perform a repetitive job to view a screen of a previous view or change a screen, whereby usability can be enhanced. Moreover, since the present invention provides a merged screen in which results of specific views are aggregated, it is unnecessary to perform a separate job of aggregating the results of the respective steps together or save result information of each of the steps separately. Therefore, the present invention enhances user's convenience.

It will be appreciated by those skilled in the art that the present invention can be specified into other form(s) without departing from the spirit or scope of the inventions.

In addition, the above-described methods can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). Further, the computer may include the controller 180 of the terminal.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A mobile terminal comprising:
a touchscreen configured to display a $1^{st}$ screen on a $1^{st}$ region; and
a controller configured to:
form a $2^{nd}$ region when a $1^{st}$ gesture is detected, wherein at least one portion of the $1^{st}$ screen of the $1^{st}$ region at a timing point of detecting the $1^{st}$ gesture to be displayed on the $2^{nd}$ region as a $2^{nd}$ screen,
change the $1^{st}$ screen of the $1^{st}$ region into a $3^{rd}$ screen when a touch input to the $1^{st}$ region is detected or in response to the forming of the $2^{nd}$ region,
generate a merged screen including at least a content of the $3^{rd}$ screen of the $1^{st}$ region and at least a content of the $2^{nd}$ screen of the $2^{nd}$ region and an information indicating correlations between the content of the $2^{nd}$ screen and the content of the $3^{rd}$ screen when a $2^{nd}$ gesture is detected, and control the merged screen to be displayed on a $3^{rd}$ region.

2. The mobile terminal of claim 1, wherein when the $1^{st}$ screen of the $1^{st}$ region is changed into the $3^{rd}$ screen, the controller controls the $2^{nd}$ screen to be maintained on the $2^{nd}$ region.

3. The mobile terminal of claim 1, wherein the $2^{nd}$ region is positioned outside the $1^{st}$ region.

4. The mobile terminal of claim 1, wherein a position of the $2^{nd}$ region and a size of the $2^{nd}$ region are set in advance.

5. The mobile terminal of claim 4, wherein the controller changes the size of the $2^{nd}$ region when a $3^{rd}$ gesture is detected.

6. The mobile terminal of claim 1, wherein the $3^{rd}$ region comprises a region equal to the $1^{st}$ region, the $2^{nd}$ region or a region resulting from merging the $1^{st}$ region and the $2^{nd}$ region together.

7. The mobile terminal of claim 1, wherein when a touch input to the $2^{nd}$ region is detected, the controller changes the $2^{nd}$ screen of the $2^{nd}$ region to a $4^{th}$ screen in response to the touch input, and wherein the controller generates the merged screen including both at least a content of the 3screen of the $1^{st}$ region and at least a content of the $4^{th}$ screen of the $2^{nd}$ region and an information indicating the correlations between the content of the $3^{rd}$ screen and the content of the $4^{th}$ screen when the $2^{nd}$ gesture is detected.

8. The mobile terminal of claim 1, wherein the controller forms a plurality of $2^{nd}$ regions to correspond to each detected count of the $1^{st}$ gesture when the $1^{st}$ gesture is repeatedly detected, and controls at least one portion of the $1^{st}$ screen at a timing point of detecting the corresponding $1^{st}$ gesture to be displayed as the $2^{nd}$ screen on a corresponding one of the $2^{nd}$ regions.

9. The mobile terminal of claim 8, wherein when some of the $2^{nd}$ regions are selected, the controller controls the merged screen to include at least a content of the $3^{rd}$ screen of the $1^{st}$ region and at least a content of the $2^{nd}$ screen of each of the selected $2^{nd}$ regions.

10. The mobile terminal of claim 9, wherein the $2^{nd}$ gesture comprises the touch input for selecting some of the $2^{nd}$ regions and the $1^{st}$ region or a pinch-in action performed on at least two of the $2^{nd}$ regions and the $1^{st}$ region.

11. The mobile terminal of claim 8, wherein when a portion of a plurality of the $2^{nd}$ regions are selected, the controller further generates the merged screen including at least a content of the $2^{nd}$ screen of each of the selected $2^{nd}$ regions in response to the $2^{nd}$ gesture and controls the merged screen to be displayed on a region resulting from merging at least two of the $2^{nd}$ regions together.

12. The mobile terminal of claim 11, wherein the $1^{st}$ region and each of a plurality of the $2^{nd}$ regions are positioned contiguous with each other, and wherein the $2^{nd}$ gesture comprises a touch drag input performed along one of boundaries formed between a plurality of the $2^{nd}$ regions.

13. The mobile terminal of claim 1, wherein the controller activates an application corresponding to a content included in the $1^{st}$ screen of the $1^{st}$ region in response to the $1^{st}$ gesture and controls an active screen of the application to be displayed on either the $1^{st}$ region or the $2^{nd}$ region.

14. A mobile terminal comprising:
a touchscreen configured to display a $1^{st}$ screen on a $1^{st}$ region; and
a controller configured to form a $2^{nd}$ region when a $1^{st}$ gesture is detected, wherein at least one portion of the $1^{st}$ screen of the $1^{st}$ region at a timing point of detecting the $1^{st}$ gesture to be displayed on the $2^{nd}$ region as a $2^{nd}$ screen, and change the $1^{st}$ screen of the first region into a $3^{rd}$ screen when a touch input to the $1^{st}$ region is detected or in response to the forming of the $2^{nd}$ region, wherein the controller activates an application corresponding to a content included in the $1^{st}$ screen of the $1^{st}$ region in response to the $1^{st}$ gesture and controls an active application screen of the application to be displayed on either the $1^{st}$ region or the $2^{nd}$ region, and
wherein at least one tab region is formed between the $1^{st}$ region and the $2^{nd}$ region, and wherein the controller performs a function that links the active application screen to the $1^{st}$ screen or the $2^{nd}$ screen when a touch input to the at least one tab region is detected.

15. The mobile terminal of claim 13, wherein the touchscreen comprises a flexible display, wherein when at least one portion of the active application screen comes in contact with the $1^{st}$ screen or the $2^{nd}$ screen by an action of folding the flexible display in one direction, the controller recognizes the folding action as the $2^{nd}$ gesture and generates the merged screen including both at least one portion of the 1st or $2^{nd}$ screen and at least one portion of the active application screen, and
wherein the at least one portion of the active application screen included in the merged screen is positioned at a part coming in contact with the at least one portion of the active application screen within the $1^{st}$ screen or the $2^{nd}$ screen.

16. A method of controlling a mobile terminal, comprising:
displaying a $1^{st}$ screen on a $1^{st}$ region within a touchscreen;
forming a $2^{nd}$ region within the touchscreen when a $1^{st}$ gesture is detected;
displaying at least one portion of the $1^{st}$ screen of the $1^{st}$ region at a timing point of detecting the $1^{st}$ gesture as a $2^{nd}$ screen;
changing the $1^{st}$ screen of the $1^{st}$ region into a $3^{rd}$ screen when a touch input to the $1^{st}$ region is detected or in response to the forming of the $2^{nd}$ region;
generating a merged screen including at least a content of the $3^{rd}$ screen of the $1^{st}$ region and at least a content of the $2^{nd}$ screen of the 2"d region and an information indicating correlations between the content of the $2^{nd}$ screen and the content of the $3^{rd}$ screen when a $2^{nd}$ gesture is detected; and
displaying the merged screen on a $3^{rd}$ region.

17. A non-transitory computer-readable media having a program recorded therein, the program comprising $1^{st}$ to $6^{th}$ commands,
wherein the $1^{st}$ command is provided to display a $1^{st}$ screen on a $1^{st}$ region within a touchscreen,
wherein the $2^{nd}$ command is provided to form a $2^{nd}$ region within the touchscreen when a $1^{st}$ gesture is detected,
wherein the $3^{rd}$ command is provided to display at least one portion of the $1^{st}$ screen of the $1^{st}$ region at a timing point of detecting the $1^{st}$ gesture as a $2^{nd}$ screen,
wherein the $4^{th}$ command is provided to change the $1^{st}$ screen of the $1^{st}$ region into a $3^{rd}$ screen when a touch input to the $1^{st}$ region is detected or in response to the forming of the $2^{nd}$ region,
wherein the $5^{th}$ command is provided to generate a merged screen including at least a content of the $3^{rd}$ screen of the $1^{st}$ region and at least a content of the $2^{nd}$ screen of the $2^{nd}$ region and an information indicating correlations between the content of the $2^{nd}$ screen and the content of the $3^{rd}$ screen when a $2^{nd}$ gesture is detected, and
wherein the $6^{th}$ command is provided to display the merged screen on a $3^{rd}$ region.

18. The mobile terminal of claim 1,
wherein the $1^{st}$ screen, the $2^{nd}$ screen and the $3^{rd}$ screen respectively include a map indicating a location information, and
the merged screen includes a map that indicates the location information of the $1^{st}$ screen, the $2^{nd}$ screen and the $3^{rd}$ screen.

19. The mobile terminal of claim 18,
wherein the controller is configured to control a scale of the map to display all the location information of the $1^{st}$ screen, the $2^{nd}$ screen and the $3^{rd}$ screen.

20. The mobile terminal of claim 1,
wherein the $1^{st}$ screen includes first search result of first word, and the $3^{rd}$ screen includes second search result of second word associated with the first word.

* * * * *